United States Patent
Ille et al.

(10) Patent No.: US 11,159,014 B2
(45) Date of Patent: Oct. 26, 2021

(54) SYSTEM AND METHOD FOR ESD PROTECTION

(71) Applicant: Infineon Technologies AG, Neubiberg (DE)

(72) Inventors: Adrien Benoit Ille, Unterhaching (DE); Claudia Kupfer, Munich (DE); Gernot Langguth, Oberhaching (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/777,292

(22) Filed: Jan. 30, 2020

(65) Prior Publication Data
US 2021/0242678 A1 Aug. 5, 2021

(51) Int. Cl.
*H02H 9/04* (2006.01)

(52) U.S. Cl.
CPC .................................. *H02H 9/046* (2013.01)

(58) Field of Classification Search
CPC ...................................................... H02H 9/046
USPC .......................................................... 361/56
See application file for complete search history.

(56) References Cited

U.S. PATENT DOCUMENTS

| 8,315,024 B2 | 11/2012 | Russ et al. |
| 2011/0063763 A1* | 3/2011 | Alvarez ............. H01L 27/0285 361/56 |

OTHER PUBLICATIONS

Amerasekera, Ajith et al., "ESD in Silicon Integrated Circuits", Texas Instruments, Wiley, Second Edition, Apr. 15, 2002, 85 pages.
Esmark, Kai et al., "Parameters for an ESD protection concept", Simulation Methods for ESD Protection Development, Chapter 2, Elsevier Ltd., Oct. 30, 2003, pp. 31-63.
Voldman, Steven H., "ESD Circuits and Devices", Wiley.com, Receiver Circuits and EDS, Jun. 2015, pp. 272-277.

* cited by examiner

*Primary Examiner* — Dharti H Patel
(74) *Attorney, Agent, or Firm* — Slater Matsil, LLP

(57) ABSTRACT

In accordance with an embodiment, a method for protecting a circuit includes: receiving a stress caused by an electrostatic discharge (ESD) event from a first node; limiting a current using a current limiting element coupled between the first node and a second node connected to the circuit; and limiting a voltage on the second node caused by the ESD event using a protection circuit including at least one MOS transistor having a load path coupled to the second node, where the at least one MOS transistor is disposed in a well, and a bias circuit coupled to a gate and a bulk connection of the at least one MOS transistor and a supply node.

19 Claims, 13 Drawing Sheets

SYSTEM AND METHOD FOR ESD PROTECTION

TECHNICAL FIELD

The present invention relates generally to a system and method for electrostatic discharge (ESD) protection.

BACKGROUND

Semiconductor integrated circuits are generally sensitive to ESD events due to the small geometry of their device structures. This is especially the case with respect to external pins or interfaces that are coupled to ESD sensitive device structures such as the gate of a metal-oxide semiconductor (MOS) transistor. Accordingly, external interfaces to a semiconductor integrated circuit are protected using various ESD circuits and method. For example, in the case of ESD sensitive interfaces, a high current ESD discharge path is defined using what is referred to as a primary ESD protection network. This primary ESD protection network is often connected between an input pin and a power supply rail, and is configured to shunt a large amount of current during an ESD event. In addition to the primary ESD protection network, additional local secondary ESD protection stages are used to further reduce interval voltages and currents during an ESD event in order to avoid local damage to sensitive device structures caused by mechanism such as dielectric breakdown and diffusion overheating.

One common secondary ESD protection network includes a series current limiting resistor coupled between an external pin and a sensitive internal node of an integrated circuit, and one or more diodes connected between the sensitive internal node and a power supply. The design of such a secondary ESD protection network, however, becomes challenging for systems, such as wireline communication receivers that are required to accept input signals having voltages that exceed the power supply voltage. In such systems, diodes coupled between signal pins and the power supply may become forward-biased during normal operation, thereby leading to signal distortion and reduced dynamic range.

SUMMARY

In accordance with an embodiment, a method for protecting a circuit includes: receiving a stress caused by an electrostatic discharge (ESD) event from a first node; limiting a current using a current limiting element coupled between the first node and a second node connected to the circuit; and limiting a voltage on the second node caused by the ESD event using a protection circuit including at least one MOS transistor having a load path coupled to the second node, where the at least one MOS transistor is disposed in a well, and a bias circuit coupled to a gate and a bulk connection of the at least one MOS transistor and a supply node.

In accordance with another embodiment, an electrostatic discharge (ESD) circuit includes: a secondary ESD protection circuit coupled between an first node and a second node configured to be coupled to a first circuit to be protected, the secondary ESD protection circuit including a current limiting element coupled between the first node and the second node, a first MOS transistor having a first load path coupled between a first supply node and the second node, a second MOS transistor having a second load path coupled between the second node and a second supply node, where the first MOS transistor and the second MOS transistor are disposed in at least one well, and a bias circuit coupled to a first gate of the first MOS transistor, a first bulk connection of the first MOS transistor, a second gate of the second MOS transistor, and a second bulk connection of the second MOS transistor.

In accordance with a further embodiment, an integrated circuit includes: a first circuit to be protected having a first input terminal coupled to an input node; a primary electrostatic discharge (ESD) protection circuit coupled to the input node and to at least one of a first supply node or a second supply node; and a secondary ESD circuit coupled between the input node and the first input terminal, the secondary ESD circuit including a current limiting element coupled between the input node and the first input terminal, at least one MOS transistor having a load path coupled to the first input terminal, a resistive bias circuit coupled to gate and bulk connections of the at least one MOS transistor.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for monitoring a switching transistor in the context of secondary ESD protection circuits for integrated circuits. The invention, however, can be applied to provide voltage and current limiting functions to other types of circuits and systems.

In accordance with an embodiment, a secondary ESD protection circuit includes a current limiting element and one or more MOS transistors having load paths coupled between a node of a circuit to be protected and one or more power supply nodes that are configured to be coupled to a power supply voltage or to ground. A bias circuit is used to bias both the gate and body of the MOS transistor. By biasing both the gate and body of the MOS transistor, the trigger voltage of the parasitic bipolar transistor (also referred to as a bipolar junction transistor) is advantageously decreased. In some embodiments, the reduced trigger voltage advantageously relaxes layout geometry constraints of the MOS transistor of the secondary ESD protection circuit, and provides the ability to reduce or avoid silicide blocked diffusion extensions. In addition, biasing both the gate and the body of the MOS transistor of the secondary ESD protection circuit advantageously allows its current handling ability to better scale with device size, as well as enabling better voltage protection for sensitive circuits and devices during ESD events. Such ESD events may include for example, an electrical overstress (EOS) event, a fast current injection ESD event such as a charged device model (CDM) and a system level ESD event, as well as an ESD event with moderate transient current injection such as human body model (HBM) ESD event.

Figure 1A:
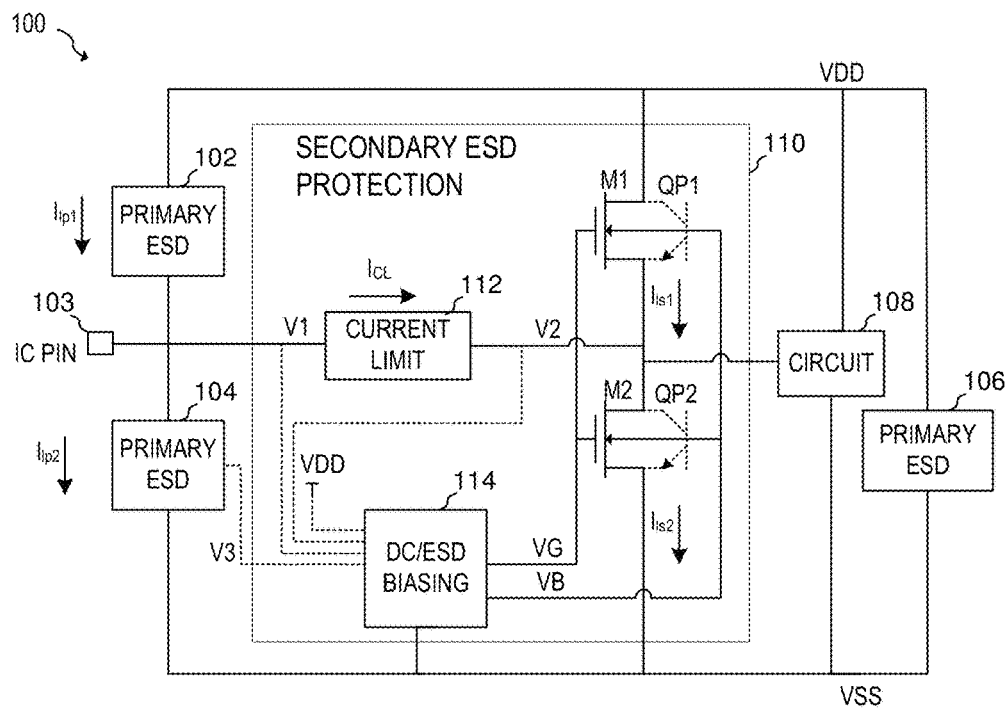
FIGS. 1A, 1C and 1D illustrate schematics of an embodiment ESD protection system.

FIG. 1A illustrates an ESD protection system 100 according to an embodiment of the present invention that is used to protect circuit 108 from a stress caused by an ESD event that occurs on integrated circuit (IC) pin 103. As shown, ESD protection system 100 includes primary ESD circuits 102, 104, and 106, and secondary ESD protection circuit 110. During an ESD event at IC pin 103, primary ESD circuits 102 and/or 104 shunts the majority of the ESD current, while secondary ESD protection circuit 110 provides additional current and voltage limiting the input of circuit 108. Accordingly, circuits sensitive to high currents and voltages within circuit 108 may be protected from the ESD event. In some embodiments, secondary ESD protection circuit 110 is connected to an input node or input terminal of circuit 108 that is directly connected to a gate of a MOS device, or other ESD sensitive device structures. In various embodiments, IC pin 103 serves as an external interface coupled to circuit 108. IC pin 103 may be implemented using external interface structures know in the art including, but not limited to an IC pad configured to be coupled to bond wires, solder balls, redistribution layers, or other structures configured to interface to packages and circuit boards.

While FIG. 1A shows three primary ESD protection circuits: primary ESD protection circuit 102 providing an ESD protection path between IC pin 103 and power supply node VDD, primary ESD protection circuit 104 providing an ESD protection path between IC pin 103 and power supply node VSS, and primary ESD circuit 106 used to provide an ESD protection path between power supply nodes VDD and VSS, it should be understood that the three primary ESD circuits 102, 104 and 106 are only shown as illustrative examples. In some embodiments, greater or fewer than three primary ESD circuits may be used. For example, primary ESD circuit 102 is optional and may be omitted in some embodiments. Primary ESD circuits 102, 104 and 106 may be implemented using primary ESD circuits known in the art such as diode, silicon controlled rectifiers (SCR), bipolar, and MOS based ESD devices, as described below with respect to FIG. 1D.

Secondary ESD protection circuit 110 includes current limiting element 112 that is coupled to IC pin 103 at node V1 and to circuit 108 at node V2. Node V1 may be also be referred to as a first node or an input node, and node V2 may also be referred to as a second node or an output node. In various embodiments, current limiting element 112 may be implemented using a resistor or other current limiting circuit or device as described below with respect to FIG. 1C. A first MOS transistor M1 has a load path coupled between nodes V2 and VDD, and a second MOS transistor M2 has a load path coupled between nodes V2 and VSS. Secondary ESD circuit 110 also includes bias circuit 114 that is configured to provide a gate bias signal the gates of MOS transistors M1 and M2 at gate bias node VG, and to provide a body bias signal the bulk connections of MOS transistors M1 and M2 at body bias node VB.

In various embodiments, power supply nodes VDD and VSS provide a power supply voltage to circuit 108, as well as other circuits and device coupled thereto. In some embodiments, node VDD is configured to have a higher voltage than node VSS. For example, node VDD may be configured to provide a positive voltage and node VSS is coupled to ground. Alternatively node VSS may be configured to provide a negative voltage with respect to a system ground (not shown).

In various embodiments ESD protection system 100 may be implemented on a semiconductor substrate, such as a single monolithic semiconductor substrate. Various semiconductor processes and fabrication techniques may be used. For example, in one embodiment, a triple well CMOS process may be used such that MOS transistors M1 and M2 are either disposed in their own respective separate p-wells, or share a p-well that is separate from the semiconductor substrate in order for the bulk connections of MOS transistors M1 and M2 to be separately biased. Alternatively, MOS transistors M1 and M2 may be disposed in their own well using a silicon-on-insulator (SOI) process. While MOS transistors M1 and M2 are shown using NMOS devices, it should be understood that PMOS devices may also be used in place of NMOS devices in alternative embodiments. In such embodiments, a standard CMOS process may be used.

In various embodiments, bias circuit 114 is configured provided to gate bias node VG to the gates of MOS transistors M1 and M2, and body bias voltage VB to the bulk connections of MOS transistors M1 and M2. In some embodiments, bias circuit 114 provides separate signals to gate bias node VG and body bias node VB. In other embodiments, bias circuit 114 provides the same signal to a common node coupled to the gate and bulk connection of MOS transistors M1 and M2. In such embodiments, this common node is designated as bias node VG/VB.

In some embodiments, ESD biasing circuit 114 couples the gate and bulk connections of MOS transistors M1 and M2 to VSS via a low ohmic connection when circuit 108 operates under nominal conditions. However, it should be appreciated that during an ESD event, the ESD ground reference is not necessarily VSS, as the ESD ground reference might be any external node of the IC. For example when a VDD pin is exposed to an ESD stress such as an HBM type ESD event, the VDD pin may become the ESD ground. In such a situation, current flows from VSS to VDD, thereby causing the local VSS connection to be one diode drop (due to a diode in primary ESD circuit 106) above the actual VSS used to bias the substrate of the IC. Thus, during an ESD event, ESD biasing circuit 114 facilitates a positive bias voltage to the gate and bulk connections of MOS transistors M1 and M2 with respect to the ESD ground reference, which could be VSS or another externally connected node. During the ESD event, ESD biasing circuit 114 may also provide a higher ohmic connection between the gate and bulk connections of MOS transistors M1 and M2 and power supply node VSS. In some embodiments, ESD biasing circuit 114 receives input and/or a trigger signal (also referred to as an ESD trigger signal) from other portions of the circuit. For example, ESD biasing circuit 114 may receive input from primary ESD circuit 104, from node V1 coupled to IC pin 103, from node V2 coupled to circuit 108 and/or from power supply node VDD. These connections are shown in dotted lines to indicate that these connections are optional and/or embodiment specific. In alternative embodiments ESD biasing circuit 114 may receive triggering and other input signals from other portions of the IC on which it is disposed. For example, ESD biasing circuit 114 may receive triggering signals from circuits and ESD devices and structures that are connected to different power domains from the power domain defined by power supply nodes VDD and VSS shown in FIG. 1A. It should also be understood that in some embodiments, secondary ESD protection circuit may be configured to provide protection to an internal signal of an IC instead of an externally connected IC pin. In some embodiments, these internal signals may be generated by circuits that are power by a power different from the power domain defined by power supply nodes VDD and VSS. Circuit 108 may also be powered by a power domain different from the power domain of secondary ESD protection circuit 110 as is explained in more detail in embodiments below.

During the an ESD event, the increased voltage and/or increased connection impedance gate bias node VG and body bias node VB serves to activate and/or enhance the activation of the parasitic bipolar operation associated with MOS transistors M1 and M2. In FIG. 1A, this parasitic bipolar operation is illustrated by explicitly denoting parasitic bipolar device QP1 coupled to MOS transistor M1 and parasitic bipolar device QP2 associated with MOS transistor M2. It should be understood, however that parasitic bipolar devices QP1 and QP2 are implicitly included in the device structure of MOS transistors M1 and M2. For example, for an NMOS device, the n-type diffusion of the NMOS device forms an emitter, the n-type diffusion of the NMOS device forms a collector, and the p-type bulk or body of the NMOS in which the n-type source and drain is disposed forms the base of an NPN parasitic bipolar transistor. In various embodiments, parasitic bipolar devices QP1 and/or QP2 are symmetrical devices. For example, when the voltage of node V2 is greater than the voltage of VDD, the portion of parasitic bipolar device QP1 coupled to node V2 functions as a collected (instead of an emitter as depicted in FIG. 1A) and the portion of parasitic bipolar device Qi coupled to VSS functions as an emitter (instead of a collector as depicted in FIG. 1A).

In embodiments that utilize PMOS devices, the p-type source of the PMOS device forms an emitter, the p-type source of the PMOS device forms a collector, and the n-type bulk or body of the PMOS device in which the p-type source and drain is disposed forms the base of a PNP parasitic bipolar transistor.

During an ESD event at IC pin 103 in which the voltage of IC pin 103 increases with respect to the voltage of power supply node VSS, primary ESD circuit 104 is activated and a potentially large current $I_{p2}$ flows between IC pin 103 and power supply node VSS. While primary ESD circuit is generally responsible for absorbing the bulk of the ESD current, the increased voltage at IC pin 103 causes current $I_{CL}$ to flow through current limiting circuit 112, which limits the magnitude of current $I_{CL}$ to a safe current level. While the magnitude of what is considered to be a safe current level varies according to the specific implementation circuit 108 and device technology used, safe current levels are generally considered to be in the range of up to a few milliamps.

Even though current $I_{CL}$ is limited by current liming circuit 112, the presence of current $I_{CL}$ may cause an increased voltage at node V2. As voltage V2 increases with respect to power supply node VSS, the resulting increased electric field in MOS transistor M2 causes impact ionization, which causes a current to flow through the body of MOS transistor M2. This impact ionization-based current causes a resulting voltage increase in the body of MOS transistor (which also form the base of parasitic bipolar transistor QP2) and effectively turns-on parasitic bipolar transistor QP2, thereby lowering the voltage of node V2. In addition, the resistance or increased resistance provided by ESD biasing circuit 114 further increases the voltage of the bulk connection of parasitic bipolar transistor QP2, which further assists in turning on parasitic bipolar transistor QP2. For example, the increased voltage at the gate of MOS transistor facilitated by ESD biasing circuit 114 further turns on MOS transistor M2, thereby causing current $I_{S2}$ to flow. This combination of increased gate and body voltage places MOS transistor M2 in a state that can handle a large amount of current, and effectively reduces the voltage level necessary at node V2 to activate parasitic bipolar transistor QP2. In some embodiments, for a given transistor size and geometry, MOS transistor M2 is capable of sinking a larger amount of ESD current and has a lower trigger voltage using ESD biasing circuit 114 than conventional embodiments that do not utilize embodiment techniques. Because of this increase in current handling capability, in some cases, smaller transistors can be used to implement the same level of ESD protection compared to conventional embodiments.

During an ESD event at IC pin 103 in which the voltage of IC pin 103 decreases with respect to the voltage of power supply node VDD, primary ESD circuit 102 is activated and a potentially large current $I_{p1}$ flows between power supply node VDD and IC pin 103. Current limiting circuit 112 limits the magnitude current flowing from node V2 to node V2 $I_{CL}$. As the voltage at node V2 decreases, MOS transistor M1 and parasitic bipolar transistor QP1 is activated via a similar mechanism explained above with respect to MOS transistor M2 and parasitic bipolar transistor QP2, thereby causing current $I_{S1}$ to flow.

Figure 1B:
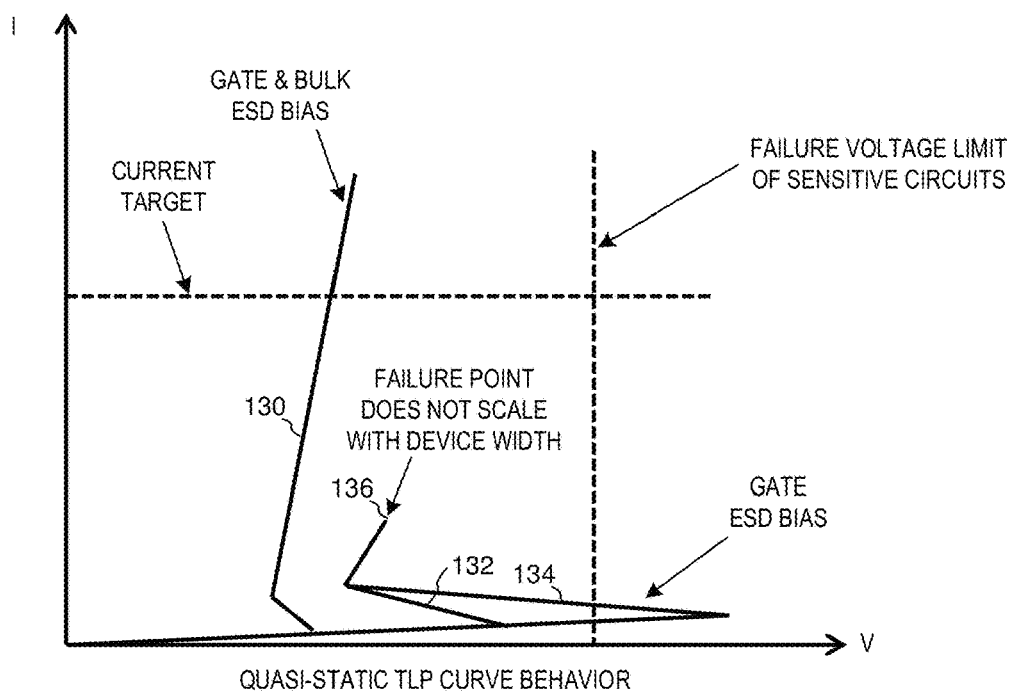
FIG. 1B illustrates a graph comparing the quasi-static TLP behavior of an embodiment ESD protection system with conventional ESD protection systems.

FIG. 1B illustrates a graph showing the quasi-static transmission line pulse (TLP) pulse behavior of an embodiment secondary ESD protection circuit in comparison to conventional ESD protection circuits. Curve 130 represents a MOS transistor (such as transistor M2 shown in FIG. 1A) of an embodiment secondary ESD protection circuit, whereas curves 132 and 134 represents MOS transistors of same device width in conventional secondary ESD protection circuits in which the bulk connection is grounded while two different gate bias are applied. One has its gate grounded 134 and the other one has its gate connected softly grounded via a resistor 132. The x-axis of the graph represents voltage applied to the drain of the MOS transistor and the y-axis represents the current conducted by the MOS transistor. A horizontal dotted line represents an example current target for the secondary ESD protection circuit, and a vertical dotted line represents an example voltage at which circuit 108 (e.g., the circuit to be protected by the secondary ESD protection circuit) is subject to failure or damage. The actual magnitudes represented by the various curves are device, technology, and implementation dependent.

As shown, the embodiment device represented by curve 130 is capable of conducting a higher current than the conventional devices in which the maximum current is limited by inhomogeneous bipolar current flow leading to much earlier thermal failure level. In addition, it is seen that the trigger voltage (e.g. the maximum voltage that needs to be applied to the drain of the MOS transistor to activate the parasitic bipolar device) is higher than that of the embodiment device. As such, in some embodiments, embodiment secondary ESD stages can be configured to be triggered at lower voltages compared to conventional embodiments. The lower triggering voltage is advantageous in that sensitive circuitry is exposed to smaller voltage excursions during an ESD event may be less likely to be damaged and/or to fail as a result of the ESD event.

Figure 1C:
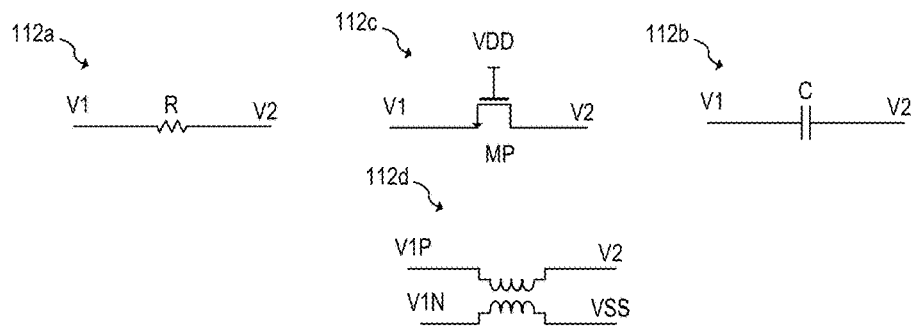

FIG. 1C illustrates four example circuits that could be used to implement current limiting element 112 shown in FIG. 1A. These four example circuits include resistor R in circuit 112a, capacitor C in circuit 112b, pass transistor MP in circuit 112c, and transformer-based balun in circuit 112d. In various embodiments, resistor R of circuit 112a may have a resistance between about 100Ω and about 10 kΩ and capacitor C of circuit 112b may have a capacitance of between about 100 fF and 20 pF depending on the particular embodiment and its implementation, however, values outside of these ranges could be used. In some embodiments, capacitor C could also function as an AC coupling capacitor.

While pass transistor MP in circuit 112c is shown as an NMOS transistor, it should be understood that PMOS transistors, or other transistor types could be used. In some embodiments, multiple circuit elements could be used to implement current limiting element 112. For example a CMOS transmission gate that includes an NMOS device and a PMOS device coupled in parallel could be used.

Transformer based balun of circuit 112d may have inputs V1P and V1N connected to two separate input pins, and may be configured to generate a single ended signal at node V2 based on the input differential signal. Alternatively, the balun of circuit 112d may be used to convert a single ended signal at an IC input into a differential signal.

It should be understood that circuits, 112a, 112b, 112c and 112d illustrated in FIG. 1C are four of many possible circuits that could be used to implement current limiting element 112. In alternative embodiments, other circuits known in the art could be used.

Figure 1D:
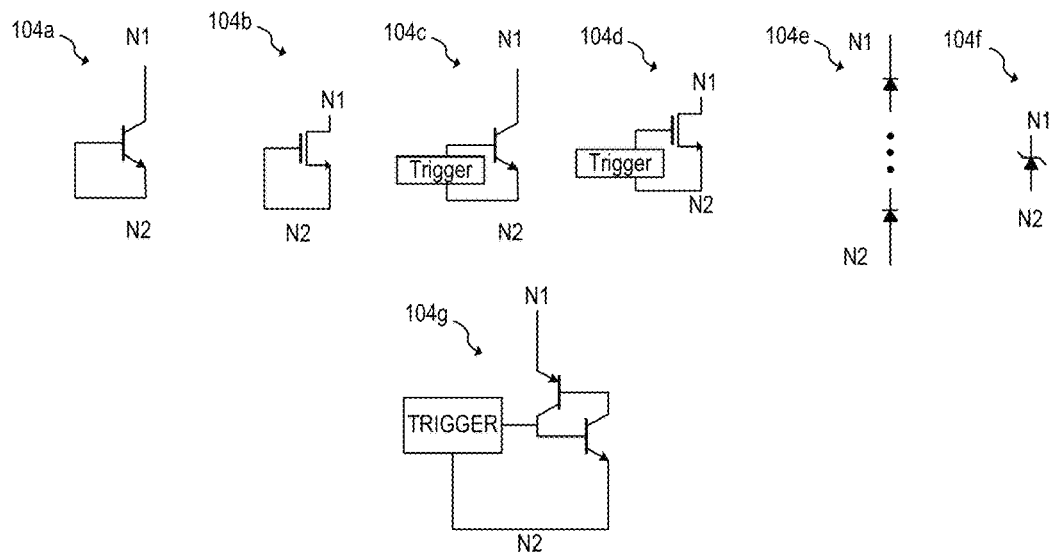

FIG. 1D illustrates seven example circuits that could be used to implement primary ESD circuit 104 shown in FIG. 1A, as well as primary ESD circuits 102 and 106. These five example circuits include the NPN bipolar transistor of circuit 104a & 104c, the NMOS transistor of circuit 104b, & 104d, the diode circuit of circuit 104e, the diode of circuit 104f and the silicon controller rectifier (SCR) circuit of circuit 104g. Each of circuits 104a, 104b, 104c, 104d, 104e, 104f and 104g show their respective devices coupled between nodes N1 and N2, which represent any two nodes on an IC between which ESD protection is suitable. In an embodiment, an NPN transistor having its base connected to its emitter (circuit 104a) or an MOS device having its gate connected to its source (circuit 104b) can be used as primary ESD circuit. Circuits 104a and 104b may be activated using via what is termed in the art as a "snapback" mechanism when activated when the device is exposed to high voltages. In some embodiments, additional bias circuitry may be coupled between the base and emitter of the bipolar transistor of circuit 104a, or between the gate and source of the MOS transistor of circuit 104b. This additional bias circuitry may include one or more resistor or capacitors, as well as other types of bias circuitry known in the art. In some embodiments, primary ESD circuit 104 may be implemented using a bipolar transistor or an MOS transistor that is activated using a trigger circuit, such as is shown with respect to circuits 104c and 104d. In an alternative embodiment, the trigger circuit may be coupled to the collector, base and emitter of the bipolar transistor of circuit 104c, and the trigger circuit may be coupled to the drain, gate and source of the MOS transistor of circuit 104d. These trigger circuits may be implemented using ESD trigger circuits known in the art.

Circuit 104e may include a single diode or a plurality of diodes coupled in series. These one or more diodes may conduct current when they are forward biased during an ESD event. Circuit 104f includes a diode that conducts current when the reverse bias voltage reaches a predetermined voltage, as well as conducting current when forward biased. Such a diode may be a Zener diode (as shown), or another type of diode that experiences junction breakdown or avalanche breakdown when reverse biased at a particular voltage. The SCR-based of circuit 104g includes a SCR represented by an NPN bipolar transistor coupled to a PNP transistor. Circuit 104g also includes a trigger circuit that is shown coupled to the base of the NPN bipolar transistor; however, in alternative embodiments a trigger circuit may be coupled to the base of the PNP transistor instead of or in addition to the base of the NPN bipolar transistor. The trigger circuit may be implemented using trigger circuits known in the art or may be implemented using trigger circuit detailed with respect to embodiments described below. In some embodiments the SCR may be implemented using a device having p-n-p-n junctions.

It should be understood that circuits, 104a, 104b, 104c, 104d, 104e, 104f and 104g illustrated in FIG. 1D are several of many possible circuits that could be used to embodiment primary ESD protection circuits. In alternative embodiments, other circuits known in the art could be used.

Figure 2:
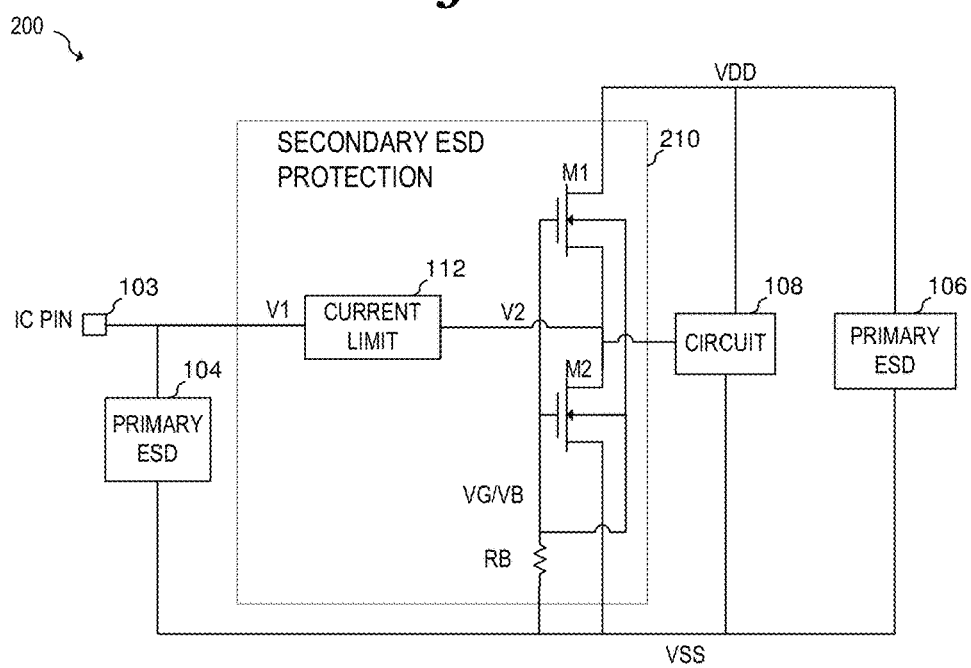
FIG. 2 illustrates a schematic of an embodiment ESD protection system in which an ESD biasing circuit of a secondary ESD protection circuit is implemented using a resistor.

FIG. 2 illustrates a schematic of ESD protection system 200 including secondary ESD protection circuit 210 in which ESD biasing circuit 114 is implemented using a resistive bias circuit such as bias resistor RB that is coupled between node VG/VB and power supply node VSS. Thus, in the embodiment of FIG. 2 a single node VG/VB is connected to the gate and bulk connections of MOS transistors M1 and M2. As shown, primary ESD circuit 104 is coupled between IC pin 103 and power supply node VSS, and primary ESD circuit 106 is coupled between power supply node VDD and power supply node VSS. However, it should be understood that other primary ESD circuits may be coupled to IC pin 103 and other power supply nodes.

During an ESD event, when the voltage at node V2 increases, body current induced in the bodies of MOS transistors M1 and M2 flow through bias resistor RB, thereby causing an increase in voltage on node VG/VB. This increase in voltage further turns on the parasitic bipolar transistors associated with MOS transistors M1 and M2, as well as increasing the gate drive on these transistors. In various embodiments, the resistance of bias resistor RB may be between about 500Ω and about 100 kΩ depending on the particular embodiment, device technology, and its implementation. In some cases, values outside this range may be used. It should be understood that ESD biasing circuit 114 may be implemented using bias resistor RB in other embodiments described below where appropriate.

Figure 3A:
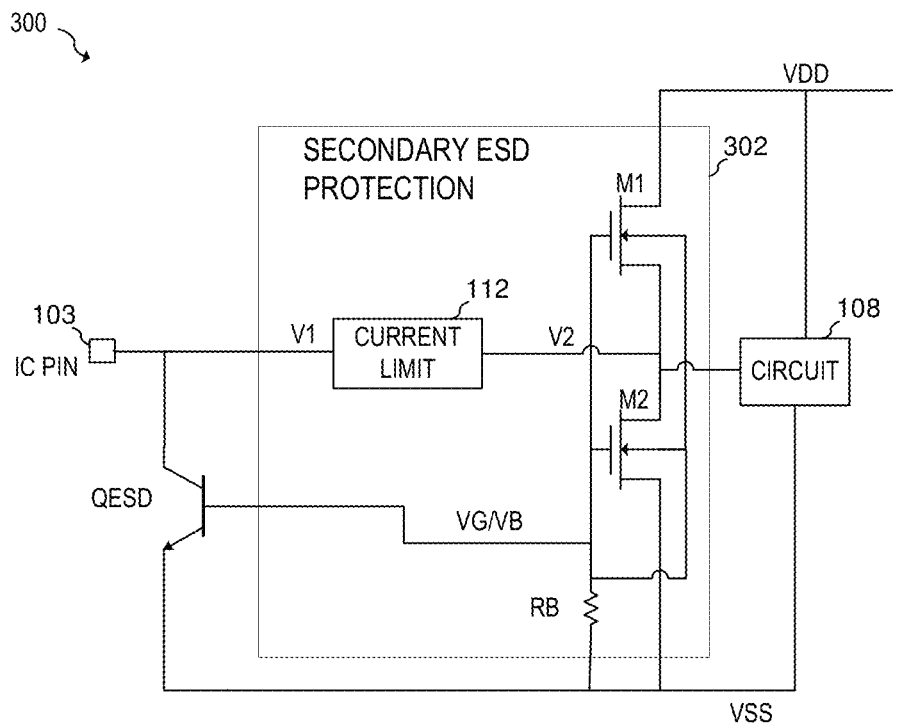
FIGS. 3A and 3B illustrate schematics of embodiment ESD protection systems in which the ESD biasing circuit of a secondary ESD protection circuit is interfaced with a primary ESD protection circuit.
Figure 3B:
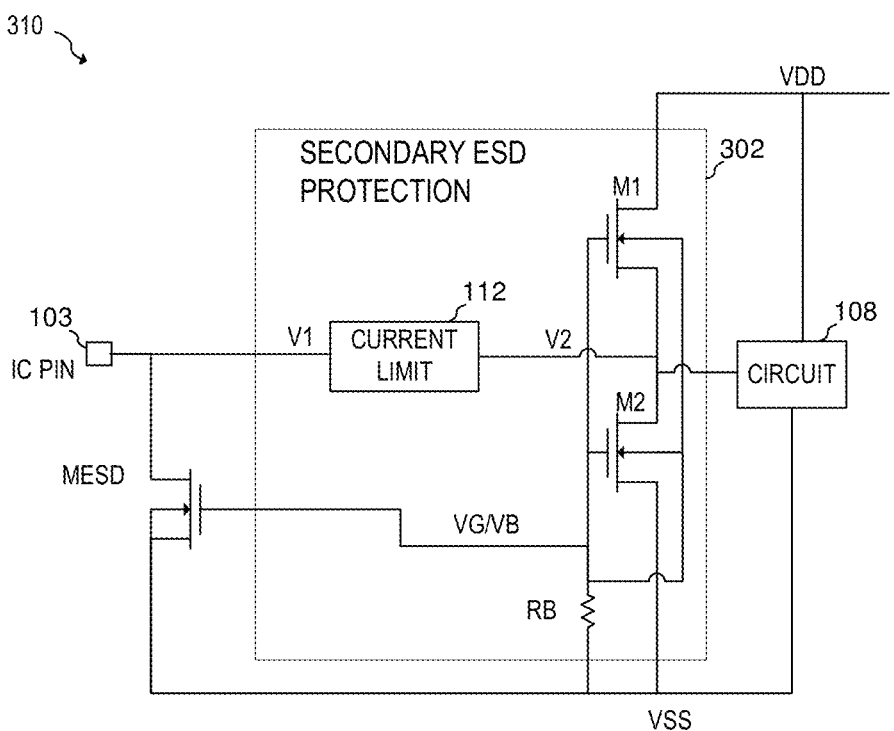

FIGS. 3A and 3B illustrate ESD protection systems in which ESD biasing circuit 114 receives a trigger signal from primary ESD protection circuit 104. For example, FIG. 3A illustrates ESD protection 300 having secondary ESD protection 302 in which ESD biasing circuit 114 is implemented using bias resistor RB, the operation of which is described above with respect to FIG. 2, and primary ESD protection circuit 104 is implemented using NPN transistor QESD. In addition, node VG/VB is also connected to the base of NPN transistor QESD having a load path connected between IC pin 103 and power supply node VSS. During ESD operation, the increased voltage at IC pin 103 due to an ESD event activates transistor QESD thereby increasing the voltage on the base of transistor QESD. This increased voltage is relayed to the gate and bulk connections of MOS transistors M1 and M2, which further enhances the ESD operation secondary ESD protection circuit 302.

ESD protection circuit 310 shown in FIG. 3B is similar to ESD protection circuit 300 shown in FIG. 3A; with the exception that ESD protection circuit 104 is implemented using an NMOS transistor MESD instead of NPN transistor QESD. ESD protection circuit 310 operates in a similar manner to ESD protection circuit 300 shown in FIG. 3A.

Figure 4A:
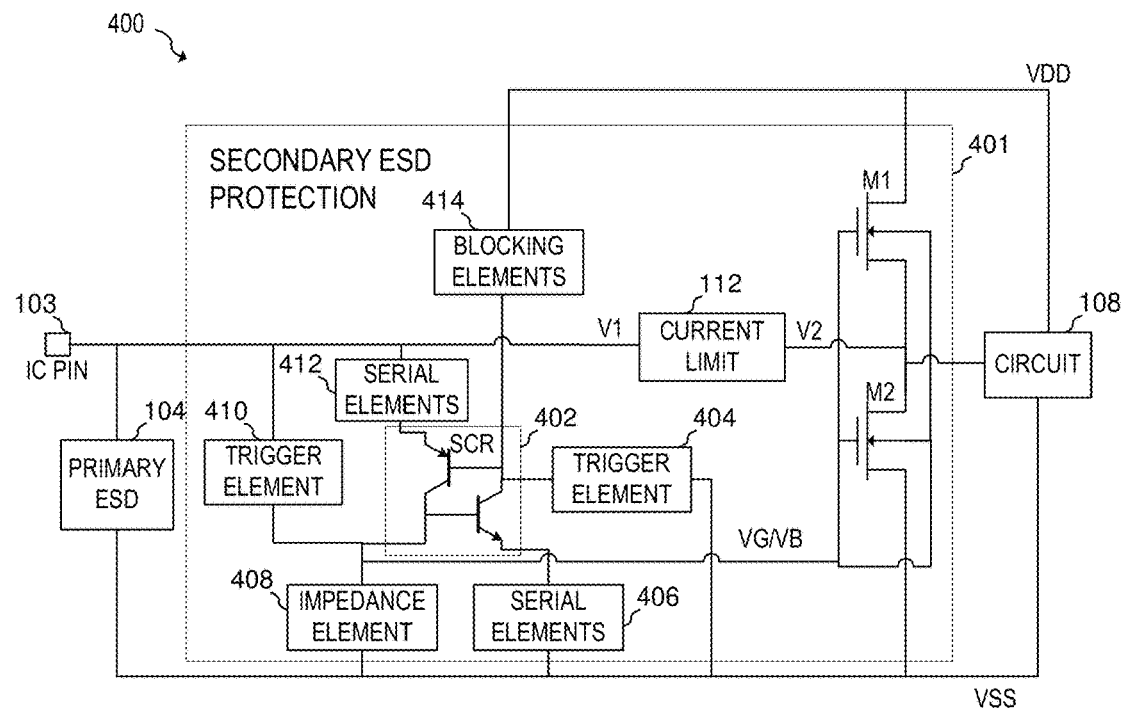
FIGS. 4A, 4B, 4C, 4D and 4E illustrate schematics of embodiment ESD protection systems in which the ESD biasing circuit of a secondary ESD protection circuit is interfaced with a silicon controlled rectifier (SCR)

FIGS. 4A through 4E illustrate ESD protection systems in which ESD biasing element 114 is implemented using an SCR-based protection device. In some embodiments, the function of this SCR-based protection device may share in the functionality of primary ESD circuit 104. FIG. 4A illustrates ESD protection system 400 that includes secondary ESD protection circuit 401 that includes an SCR-based biasing and protection circuit. As shown, SCR 402 is coupled to node V1 via serial elements 412 and is coupled to power supply node VSS via serial elements 406 and impedance element 408. In various embodiments, secondary ESD protection 401 may include trigger element 410 coupled between SCR 402 and node V1 and/or trigger element 404 coupled between SCR 402 and power supply node VSS. The gate and bulk connections of MOS transistors M1 and M2 are connected to impedance element 408 and SCR 402 at the base of the NMOS transistor. In some embodiments, blocking elements 414 may also be connected between SCR 402 and power supply node VDD. As mentioned above SCR 402 may also function as primary ESD protection. However, in some embodiments, an additional primary ESD protection circuit 104 may be coupled in parallel with the SCR-based circuit.

In various embodiments, impedance element 408 may be implemented using a resistor, a load path of a transistor, or other circuit elements or combination thereof; serial elements 412 may include one or more diodes, diode connected transistors, bipolar transistors, other circuit elements or a combination thereof; and blocking elements 414 may include one or more diodes, diode connected transistors, resistors, other circuit elements or a combination thereof. Trigger elements 404 and 410 may be implemented using trigger elements known in the aft. Specific examples of serial elements 412, serial elements 406, impedance element 408, trigger element 410, trigger element 404, and blocking elements 414, are given in the specific examples of FIGS. 4A through 4E. However, it should be understood that embodiment implementations are not limited to the specific examples disclosed herein.

During ESD operation of SCR-based secondary ESD protection circuit 401, when the voltage of IC pin 103 exceeds the trigger voltage of the SCR-based circuit, SCR 402 conducts current, and the voltage of node VG/VB increases. As described in embodiments above, the increased voltage of node VG/VB enhances the operation and current handling capabilities of MOS transistors M1 and M2.

Figure 4B:
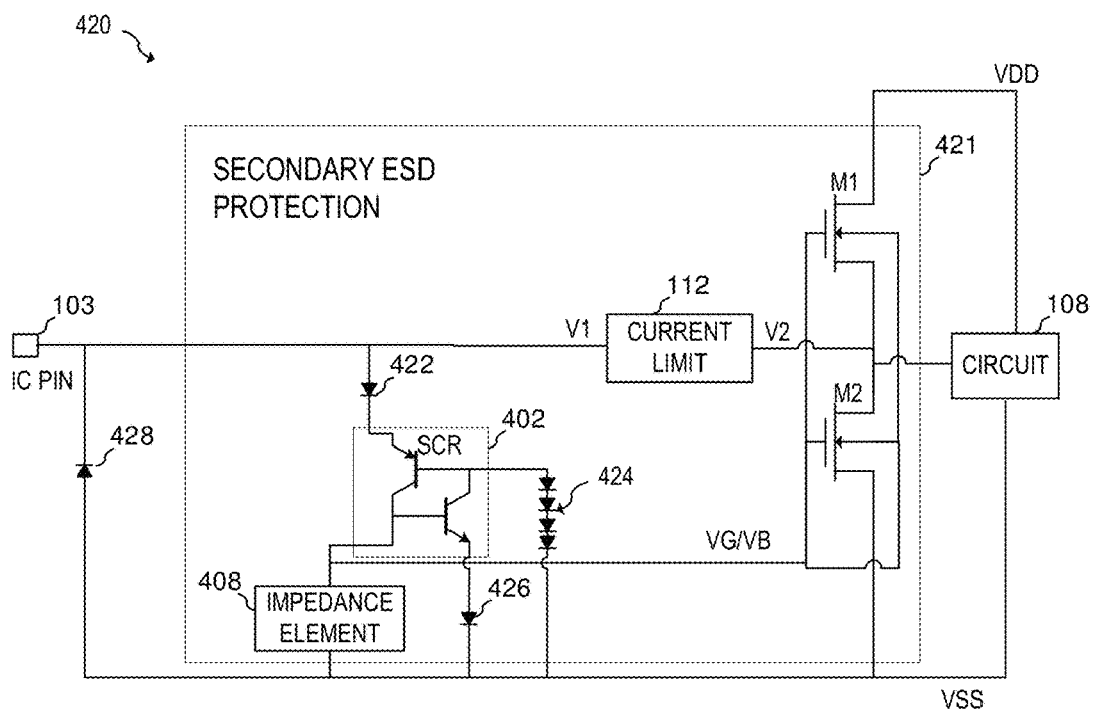

FIG. 4B illustrates ESD protection system 420 that includes secondary ESD protection circuit 421 including an SCR-based circuit. As shown, the SCR-based circuit includes SCR 402, diode 422, series connected diodes 424, diode 426 and impedance element 408. In various embodiments, diode 422 is used to implement serial element 412, series connected diodes 424 are used to implement trigger element 404, and diode 426 is used to implement serial element 406 of the embodiment of FIG. 4A. In the embodiment of FIG. 4B, trigger element 410 and blocking elements 414 are shown to be omitted. However these blocks may also be included in alternative embodiments of the present invention. During operation, when the voltage of IC pin increases, SCR 402 is triggered when the voltage between IC pin 103 and supply node VSS approaches about six diode drops, which corresponds to a voltage of between about 3.5 V and 5 V depending on the particular structure and implementation of secondary ESD protection circuit 421. These six diode drops correspond to diode 422, the base emitter junction of the NPN transistor of SCR 402, and the four series coupled diodes 424. In alternative embodiments of the present invention, the number of series connected diodes 424 may be greater than or less than four. Accordingly the trigger voltage of the SCR-based circuit can be increased by increasing the number of series connected diodes 424 and can be decreased by reducing the number of series connected diodes 424.

Figure 4C:
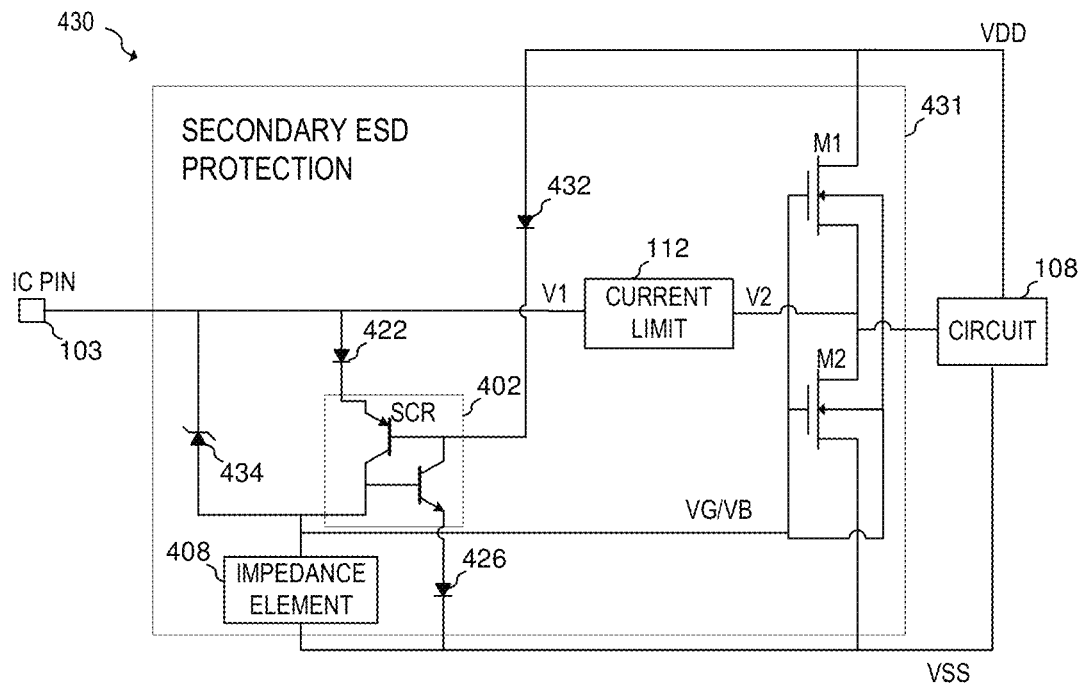

FIG. 4C illustrates ESD protection system 430 that includes secondary ESD protection circuit 431 including an SCR-based circuit. As shown, the SCR-based circuit includes SCR 402, diode 422, diode 426, optional diode 432, impedance element 408, and Zener diode 434. In various embodiments, diode 422 is used to implement serial element 412, Zener diode 434 is used to implement trigger element 410, optional diode 426 is used to optionally implement serial element 406, and diode 432 is used to implement blocking element 414 of the embodiment of FIG. 4A. In the embodiment of FIG. 4C, trigger element 404 is omitted; however this block may also be included in alternative embodiments of the present invention. During ESD operation, when the voltage of IC pin increases, the breakdown of Zener diode 434 delivers current to impedance element 408 and forward biases the base-emitter junction of the NPN device of SCR 402, which activates the SCR 402. In various embodiments, diode 432, which is used to bias the N-well of SCR 402 during IC standard operation, does not provide an ESD discharge path.

Figure 4D:
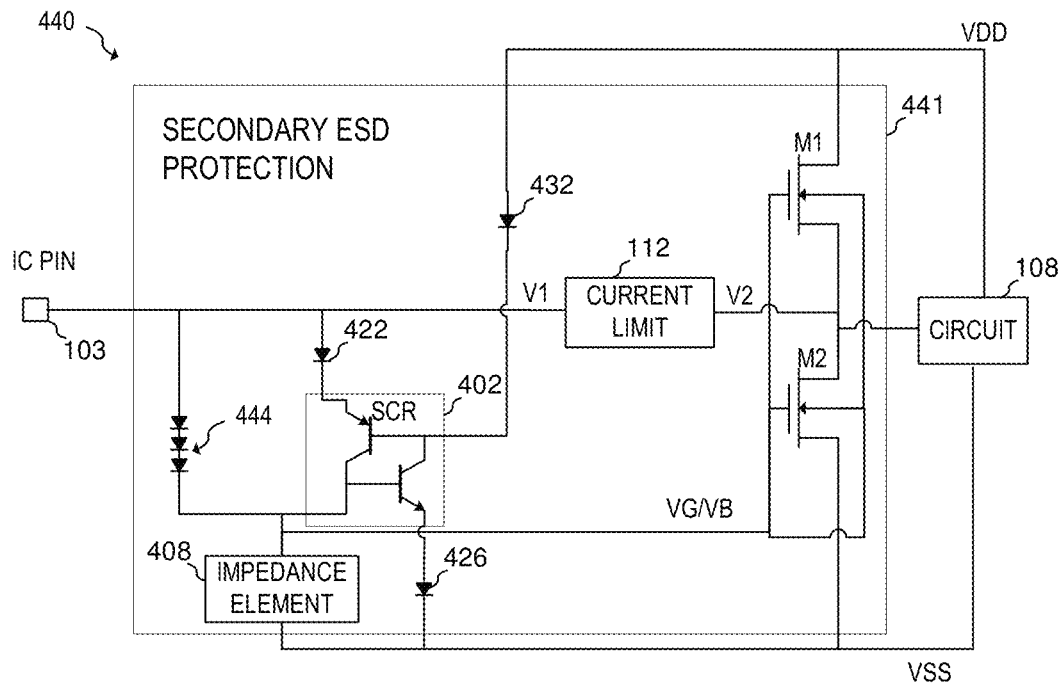

FIG. 4D illustrates ESD protection system 440 that includes secondary ESD protection circuit 441 including an SCR-based circuit. As shown, the SCR-based circuit includes SCR 402, diode 422, diode 426, series connected diodes 444, and impedance element 408. In various embodiments, diode 422 is used to implement serial element 412, series connected diodes 444 are used to implement trigger element 410, diode 426 is used to implement serial element 406, and diode 432 is used to implement blocking element 414 of the embodiment of FIG. 4A. In the embodiment of FIG. 4D, trigger element 404 is omitted; however this block may also be included in alternative embodiments of the present invention. In some embodiments series connected diodes 444 or blocking element 432 may be omitted.

During ESD operation, when the voltage of IC pin increases, SCR 402 is triggered when the voltage between IC pin 103 and supply node VSS approaches five diode drops due to diode 426, the base-emitter junction of the NPN device of SCR 402, and the five series connected diodes 444, which correspond to a total voltage of between about 3 V and about 4 V. In alternative embodiments of the present invention, the number of series connected diodes 444 may be greater than or less than three. Accordingly the trigger voltage of the SCR-based circuit can be increased by increasing the number of series connected diodes 444 and can be decreased by reducing the number of series connected diodes 444.

Figure 4E:
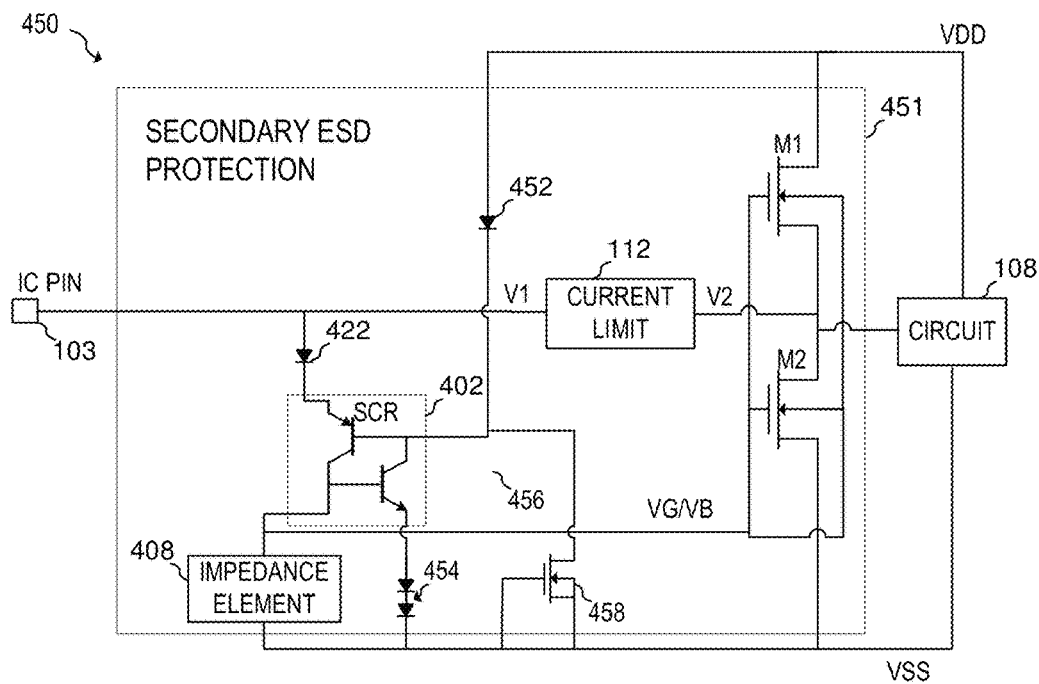

FIG. 4E illustrates ESD protection system 450 that includes secondary ESD protection circuit 451 including an SCR-based circuit. As shown, the SCR-based circuit includes SCR 402, diode 422, series connected diode 454, impedance element 408, and diode 452. In various embodiments, diode 422 is used to implement serial element 412, series connected diodes 454 are used to implement serial element 406, and diode 452 is used to implement blocking element 414 of the embodiment of FIG. 4A. In addition, the trigger element 404 is implemented as a grounded gate NMOS transistor 458. In the embodiment of FIG. 4E, trigger element 410 is omitted; however this block may also be included in alternative embodiments of the present invention.

During ESD operation, SCR 402 is triggered when IC pin 103 undergoes a rapid increase in voltage. In an embodiment, the resulting transient signal on node V1 is coupled to the drain of transistor 458 via diode 422 as well as to the base-emitter junction of the PNP transistor of SCR 402. When NMOS transistor 458 undergoes parasitic bipolar operation it causes a trigger current to flow to the base of the PNP transistor of SCR 402, which activates SCR 402, and causes the voltage of node VG/VB to increase as explained above.

It should be understood that the embodiments of FIGS. 4A-4E are just few specific examples of an SCR circuit can be used in conjunction with embodiment secondary ESD protection devices and methods. In other embodiments of the present invention, SCR 402 may be implemented using other circuits and methods.

Figure 5A:
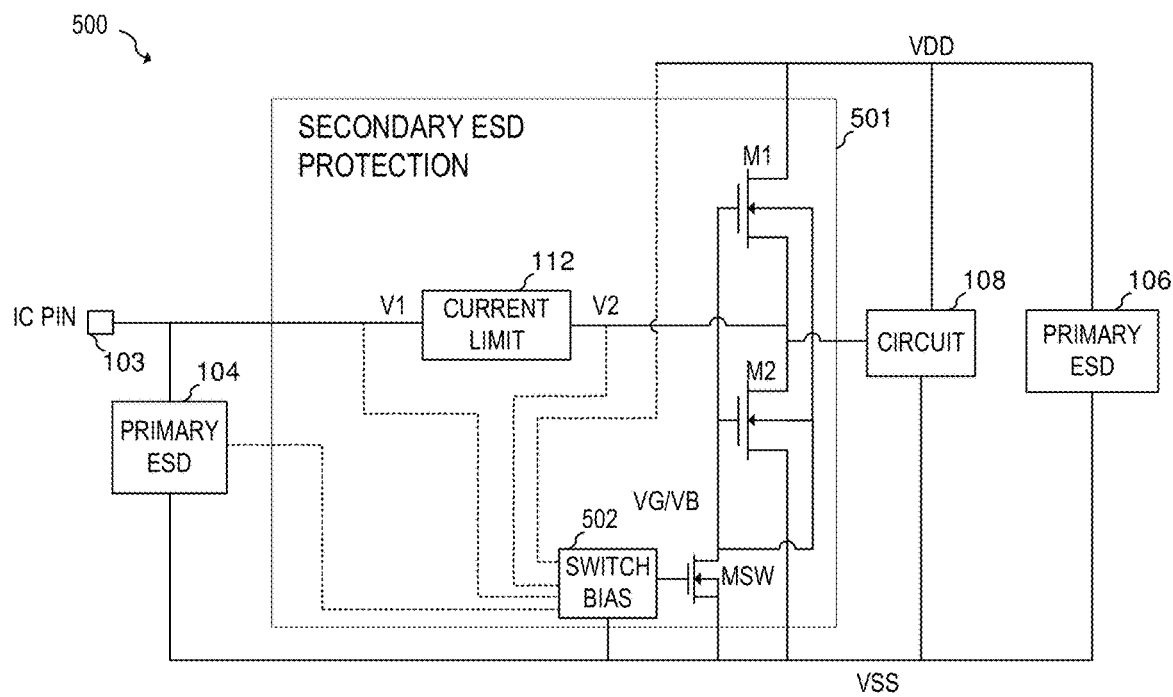
FIGS. 5A, 5B, 5C and 5D illustrate schematics of embodiment ESD protection systems in which the ESD biasing circuit of a secondary ESD protection circuit is implemented using a transistor.

FIG. 5A illustrates a schematic of ESD protection system 500 that includes secondary ESD protection circuit 501 in which ESD biasing circuit 114 is implemented using transistor MSW (also referred to as a bias transistor) and switch bias circuit 502. As shown, the load path of transistor MSW is connected between node VG/VB and power supply node VSS. When MOS transistor MSW is implemented using an NMOS device, the drain of transistor MSW is connected to node VG/VB and the source of transistor MSW is connected to power supply node VSS. The drain and source of transistor MSW may also be referred to as load path terminals. Primary ESD circuit 104 is coupled between IC pin 103 and power supply node VSS, and primary ESD circuit 106 is coupled between power supply node VDD and power supply node VSS. However, it should be understood that other primary ESD circuits may be coupled to IC pin 103 and other power supply nodes.

As indicated by the dotted line connections, switch bias circuit 502 may be coupled to node V1, node V2, power supply node VDD and/or primary ESD circuit 104. Switch bias 502 may receive activation signals from other sources as well. During nominal operation of circuit 108, the load path of transistor MSW is in a low impedance state (e.g. the transistor is on). However, during an ESD event, switch bias 502 shuts off transistor MSW, thereby increasing the impedance between the gate and bulk connections of MOS transistors M1 and M2 to VSS. This increase in impedance enhances the ESD operation of MOS transistors M1 and M2 as described in embodiments above. While transistor MSW is shown implemented using an NMOS transistor, it should be understood that in alternative embodiments of the present invention, other transistor types, such as PMOS transistors and bipolar transistors, may be used to implement transistor MSW.

Figure 5B:
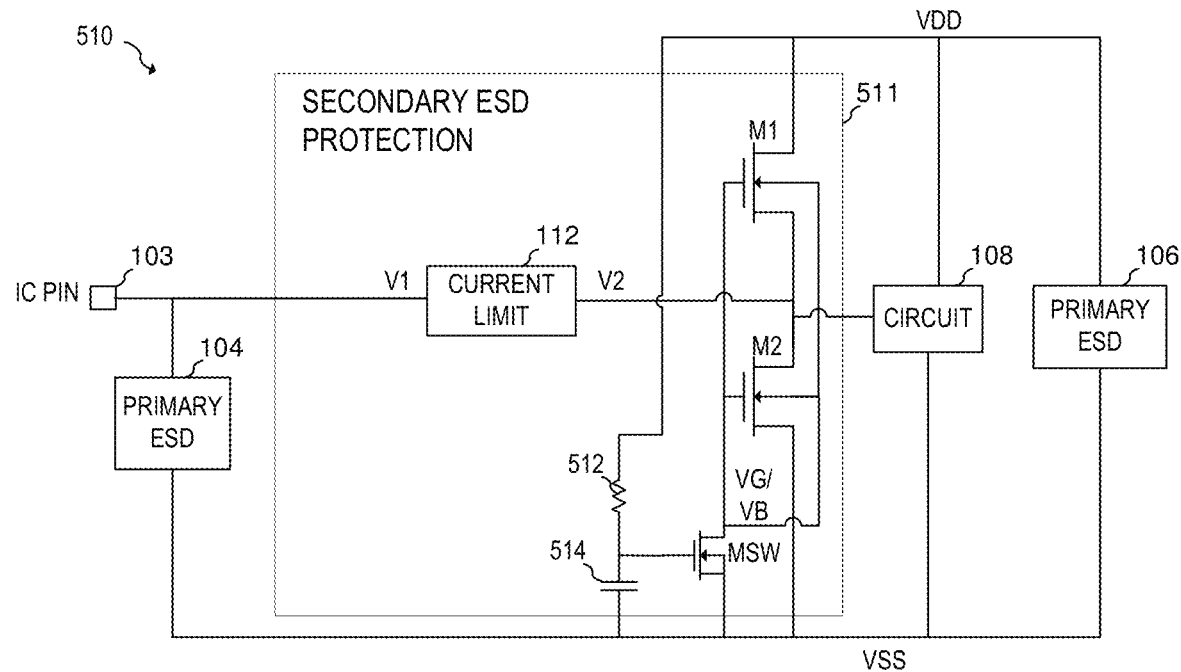
Figure 5C:
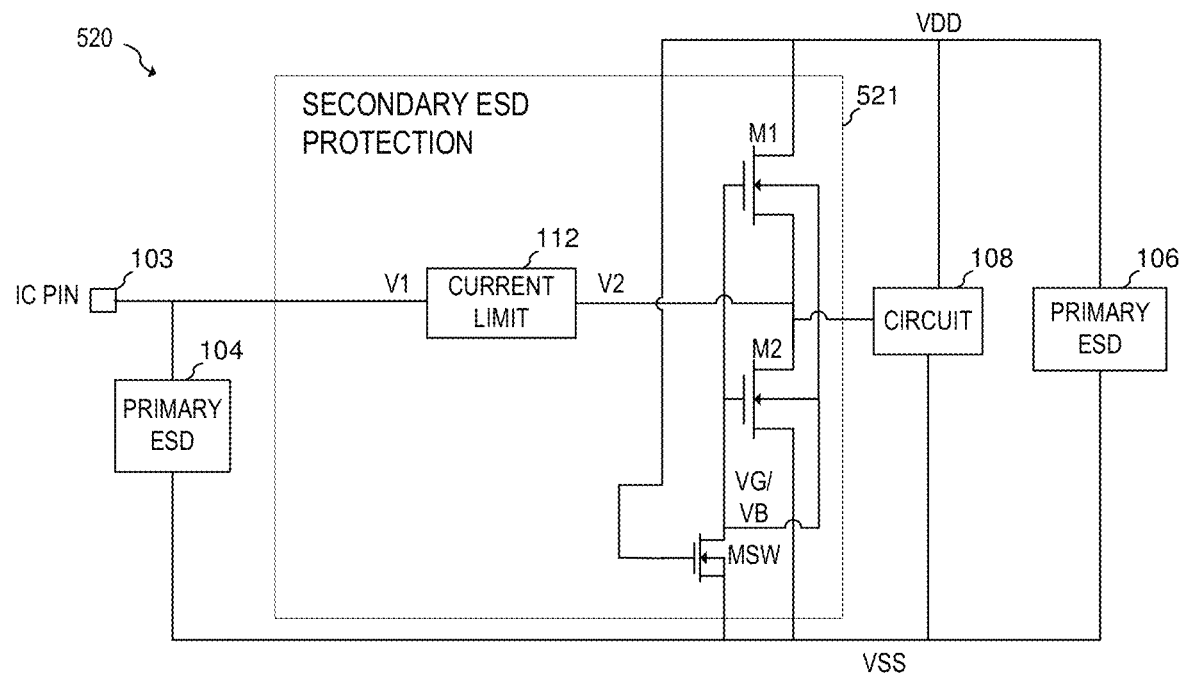
Figure 5D:
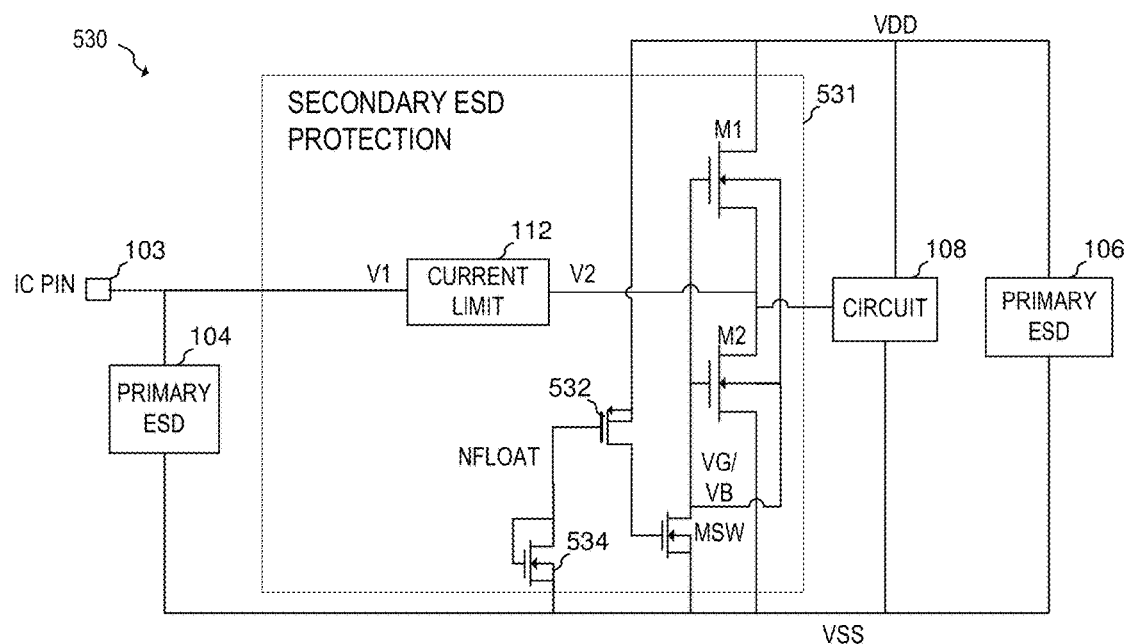

FIGS. 5B to 5D illustrate specific implementations of the circuit of FIG. 5A. For example, FIG. 5B illustrates ESD protection system 510 that includes secondary ESD protection circuit 511. In an embodiment, switch bias circuit 502 is implemented using resistor 512 connected between the gate (also referred to as the control node) of transistor MSW and power supply node VDD, and capacitor 514 coupled between the gate of transistor MSW and supply node VSS. During nominal operation, the gate of transistor MSW assumes the voltage potential of power supply node VDD due to resistor 512 and is turned-on. However, during an ESD event, in case of an un-powered IC, the dynamical behavior of the triggering circuit ensures that the gate of the MSW NMOS is tied to VSS via capacitor 514. For example, this bias circuit is effective for ESD positive stress at IC PIN 103 with respect to VSS or ESD positive stress on VDD with respect to IC PIN 103. This signal received by the gate or control nodes of transistor MSW may also be referred to as an ESD activation signal. This transient or ESD activation signal reduces the gate source voltage of transistor MSW and effectively turns off transistor MSW and increases the impedance between the gate and bulk connections of MOS transistors M1 and M2 and power supply node VSS. In various embodiments, resistors 512 and 514 may be configured to have an RC time constant between about 1 ns and about 1 μs. Alternatively, RC time constants outside of this range may be used.

FIG. 5C illustrates ESD protection system 520 that includes secondary ESD protection circuit 521. In an embodiment, switch bias circuit 502 is implemented by directly connecting the gate of transistor MSW to supply node VDD. During nominal operation, the gate of transistor MSW assumes the voltage potential of power supply node VDD due to resistor 512. However, during an ESD event in which the voltage between power supply node VDD and VSS decreases below the threshold voltage of transistor MSW, transistor MSW is turned-off, thereby increasing the impedance between the gate and bulk connections of MOS transistors M1 and M2 and power supply node VSS. In the case of an ESD stress that occurs when VDD is floating, the potential of the gate of transistor MSW is dynamically tied to VSS, which increases the impedance between the gate and bulk connections of MOS transistors M1 and M2 and power supply node VSS.

FIG. 5D illustrates ESD protection system 530 that includes secondary ESD protection circuit 531. In an embodiment, switch bias circuit 502 is implemented using a "tie-high" cell that includes PMOS transistor 532 having a load path connected between the gate of transistor MSW and power supply node VDD, and diode connected NMOS transistor 534 coupled between power supply node VSS and the gate of PMOS transistor 532 at node NFLOAT. During normal operation of circuit 108, transistor 534 pulls the gate of PMOS transistor 532 to ground, thereby turning on PMOS transistor 532 and providing a low impedance path between the gate of transistor MSW and power supply node VDD, which effectively turns on transistor MSW. During an ESD event in which the voltage difference between VDD and VSS is reduced, transistor MSW is turned-off, thereby increasing the impedance between the gate and bulk.

It should be understood that the embodiments of FIGS. 5A-5D are just few specific examples of switching transistor and a switch bias circuit that can be used in conjunction with embodiment secondary ESD protection devices and methods. In other embodiments of the present invention, switch bias circuit 502 may be implemented using other circuits and methods.

Figure 6A:
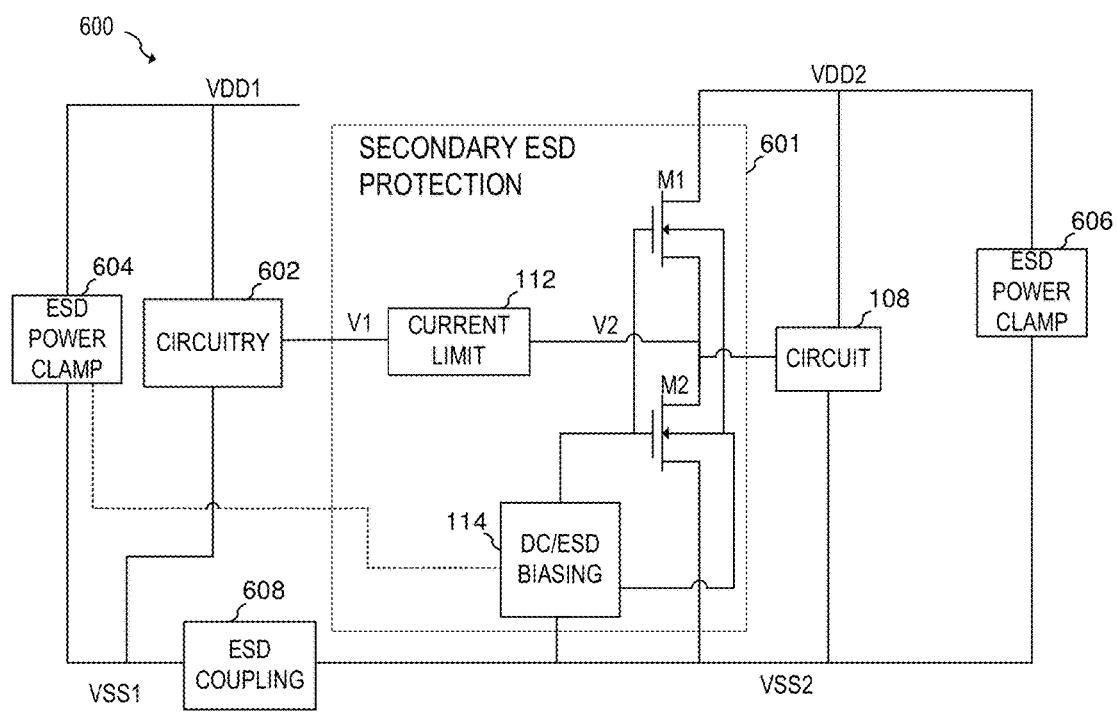
FIGS. 6A, 6B, 6C, 6D, 6E and 6F illustrate schematics of embodiment ESD protection systems in which the secondary ESD protection circuit is interfaced to internal circuit coupled to a different power supply domain.

In addition to operating in a single voltage domain, secondary ESD protection circuits according to embodiments of the present invention may be used to provide secondary ESD protection between components of multiple power supply domains, as is described with respect to FIG. 6A through 6E. FIG. 6A illustrates an embodiment ESD protection system 600 that includes secondary ESD protection circuit 601. As shown, secondary ESD protection circuit 601 includes current limiting circuit 112 MOS transistors M1 and M2 that provide the secondary ESD protection to node V2 and ESD biasing circuit 114. Instead of current limit circuit 112 being coupled to IC input pin 103 as is described in embodiments above, current limiting circuit 112 is coupled to circuitry 602 that is powered by a different voltage domain. As shown, circuitry 602 is coupled to a first voltage domain that includes power supply nodes VDD1 and VSS1, whereas secondary ESD protection circuit 601 and circuit 108 is coupled to a second voltage domain that includes power supply nodes VDD2 and VSS2.

In the case of an ESD event within the first power domain, ESD biasing circuit 114 receives an ESD trigger signal from ESD power clamp 604. In response to the ESD trigger signal, ESD biasing circuit 114 provides appropriate biasing signals to the gate and bulk connections of MOS transistors M1 and M2 as described in embodiments above. In some embodiments, an ESD coupling circuit 608 is coupled between power supply node VSS1 of the first power domain and power supply node VSS2 of the second power domain. ESD coupling circuit 608 may be implemented using ESD coupling circuits known in the art. For example, in one embodiment, one or more pairs of back-to-back diodes may be used. In some embodiments, ESD power clamp 606 may be optionally coupled between power supply nodes VDD2 and VSS2 of the second power domain. ESD power clamps 604 and 606 may be implemented, for example, using ESD power clamp structures known in the art. ESD biasing circuit 114 may be implemented using triggered ESD biasing circuit embodiments described above. For example, the implementations of ESD biasing circuit 114 and its associated circuitry may as shown in FIGS. 2, 3A, 3B and 4A-4E may be applied to the embodiments of FIGS. 6A and 6B.

Figure 6B:
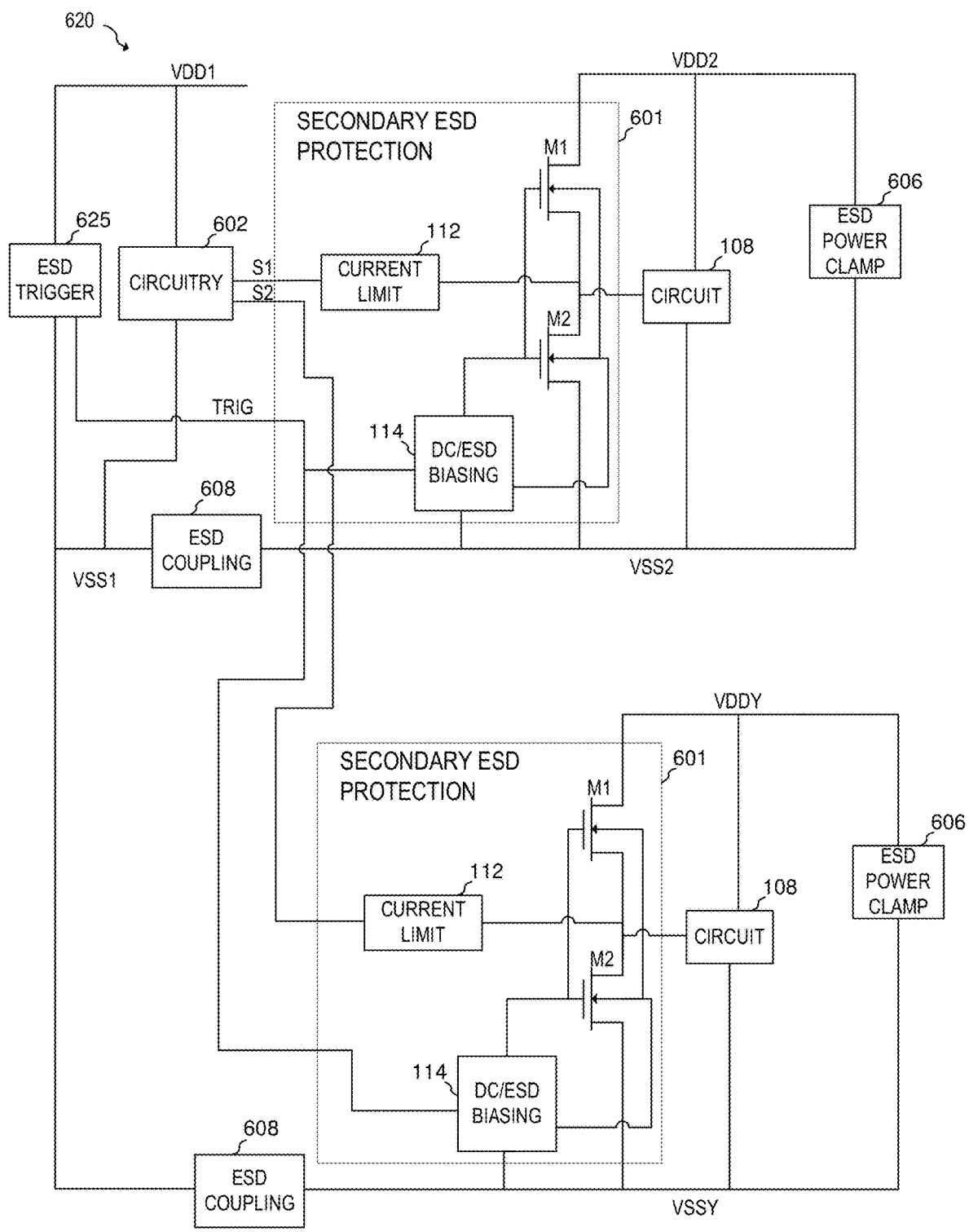

The embodiment of FIG. 6A can also be extended to operate over multiple voltage domains. FIG. 6B illustrates ESD protection 620 that includes ESD trigger 625 and circuitry 602 that is powered by the first power domain associated with power supply nodes VDD1 and VSS1, and two instances of secondary ESD protection circuits 601 coupled to circuit 108 coupled to different power supply domains. As shown, one instance of secondary ESD protection circuit 601 and circuit 108 is connected to the second power domain associated with power supply nodes VDD2 and VSS2, which is similar to the embodiment of FIG. 6A. In addition to the secondary ESD protection circuit 601 and circuit 108 associated with the second power supply domain, an additional instance of secondary ESD protection circuit 601 and circuit 108 associated with an additional power domain associated with power supply nodes VDDY and VSSY as shown. Similar to the embodiment of FIG. 6A, power supply node VSSY of the $y^{th}$ power supply domain is coupled to power supply VSS1 of the first power supply domain via ESD coupling circuit 608. During an ESD event, ESD trigger 625 provides an ESD trigger signal TRIG to ESD biasing circuit 114 of each secondary ESD protection circuit 601 and each power supply domain. Accordingly, an ESD event that occurs in one power supply domain can be used to enhance the operation of secondary ESD protection circuits in other power supply domains. While only two power supply domains having secondary ESD protection circuit 601 are shown in FIG. 6B, it should be understood that any number of power supply domains having embodiment secondary ESD protection circuits may be used. In some embodiments, ESD trigger 625 and its associated biasing circuit (e.g. biasing portions of ESD biasing circuit 114) is merged together and referenced to the first power domain associated with power supply nodes VDD1 and VDD2, such that only a single bias node VG/VB is routed to the second ESD protection stages 601 of all y power domains associated with power supply nodes VDDY and VSSY.

It should also be understood that the various ESD triggering circuits described below with respect to FIGS. 6C through 6F can also be applied to the embodiment of FIG. 6B.

Figure 6C:
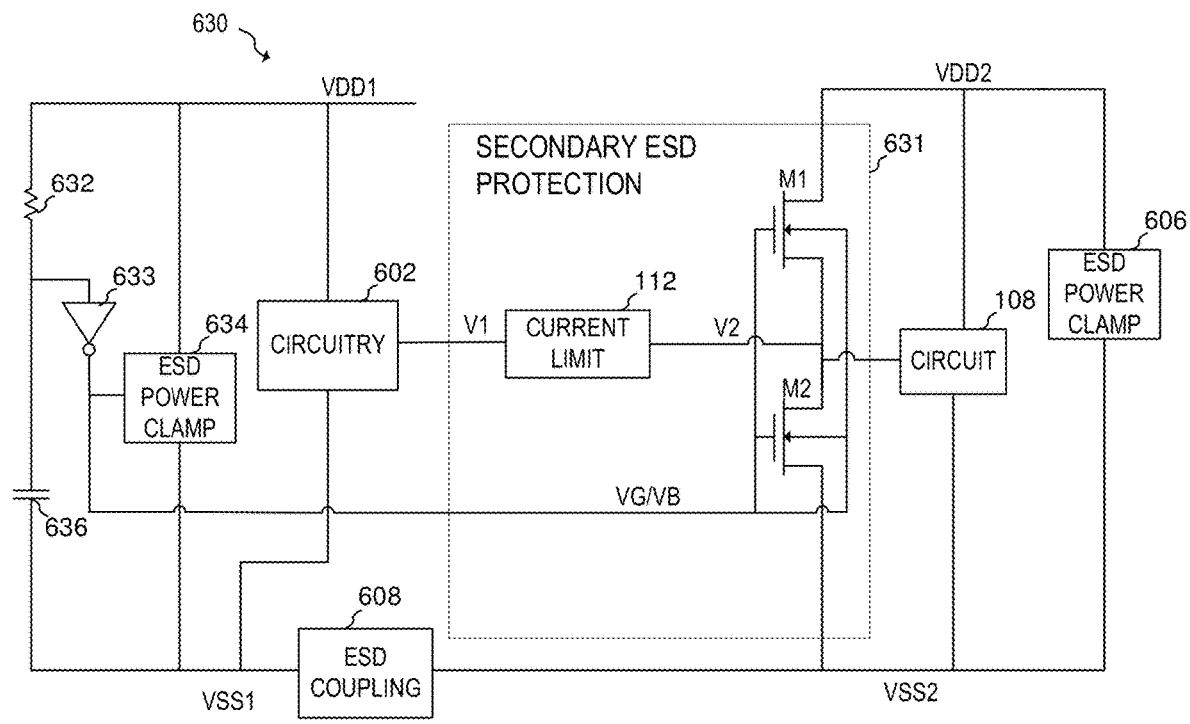

FIG. 6C illustrates ESD protection system 630 that includes secondary ESD protection circuit 631 according to an embodiment of the present invention. Here, ESD trigger circuit 625 is implemented using inverter 633, resistor 632 that is connected between power supply node VDD1 and the input of inverter 633, and capacitor 636 that is connected between the input of inverter 633 and power supply node VSS1. During nominal operation, the voltage potential of power supply node VDD1 is applied to the input of inverter 633 via resistor 632. This causes the output of inverter 633 to be at the voltage potential of power supply node VSS1 and provides a low ohmic path between the gate and bulk connections of MOS transistors M1 and M2. If an ESD event occurs that causes a rapid decrease in potential of node VSS1, this transient disturbance of power supply node VSS1 is coupled to the input node of inverter 633, and causes the output of inverter 633 to be pulled high. The increased voltage at the output of inverter 633 increases the voltage supplied to the gate and bulk connections of MOS transistor M1 and M2 within secondary ESD protection circuit 631, thereby enhancing the current handling capability of secondary ESD protection circuit 631. In some embodiments, the output of inverter 633 may also be used to trigger an ESD power clamp 634 that is coupled between power supply nodes VDD1 and VSS1 of the first supply domain.

Figure 6D:
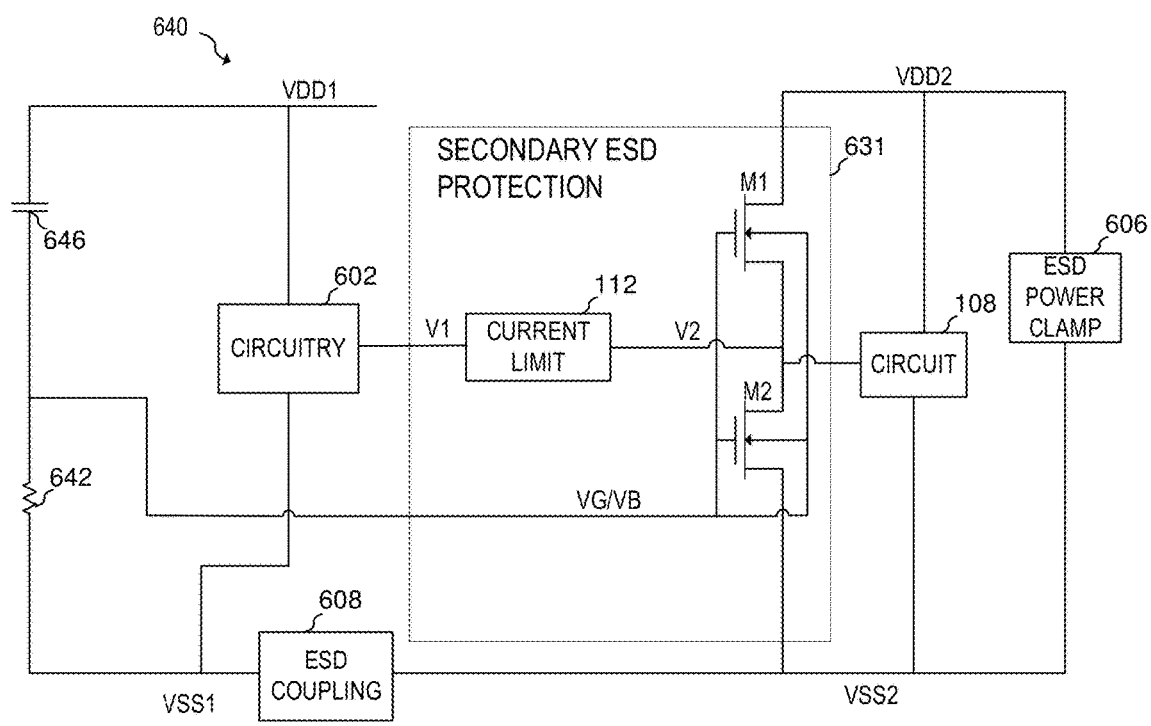

FIG. 6D illustrates ESD protection system 640 that includes secondary ESD protection circuit 631 according to an embodiment of the present invention. Here, ESD trigger circuit 625 is implemented using resistor 642 coupled between power supply node VSS1 and node VG/VB, and capacitor 646 coupled between power supply node VDD1 and node VG/VB. During nominal operation, the voltage potential of power supply node Vss1 is applied to the gate and bulk connections of MOS transistors M1 and M2. If an ESD event occurs that causes a rapid decrease increase in the potential of power supply node VDD1 with respect the of power supply node VSS1, this disturbance is coupled to the gate and bulk connections of MOS transistors M1 and M2 via capacitor 646. This coupled disturbance increases the voltage of the gate and bulk connections of MOS transistors M1 and M2, thereby enhancing the operation of secondary ESD protection circuit 631.

Figure 6E:
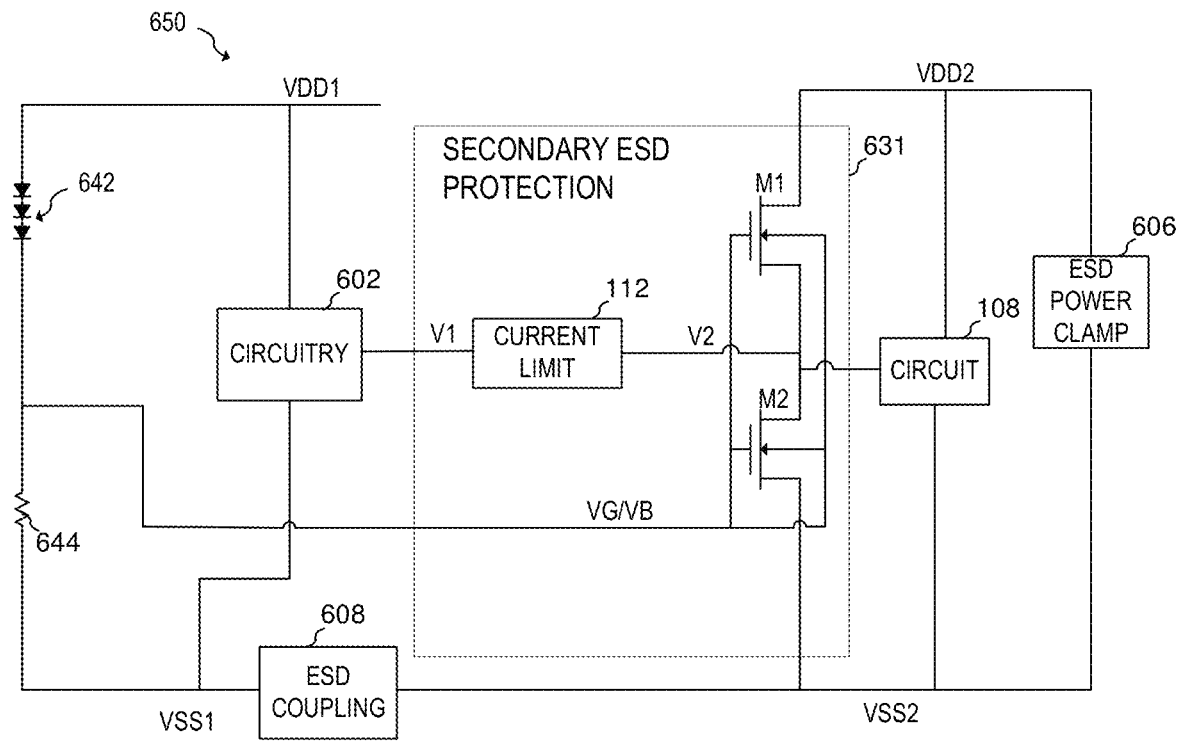

FIG. 6E illustrates ESD protection system 650 that includes secondary ESD protection circuit 631 according to an embodiment of the present invention. Here, ESD trigger circuit 625 is implemented using resistor 644 coupled between power supply node VSS1 and node VG/VB, and series connected diodes 642 coupled between power supply node VDD1 and node VG/VB. During nominal operation, the voltage potential of power supply node Vss1 is applied to the gate and bulk connections of MOS transistors M1 and M2. If an ESD event occurs that causes a rapid decrease increase in the potential of power supply node VDD1 with respect the of power supply node VSS1, this disturbance is coupled to the gate and bulk connections of MOS transistors M1 and M2 via diodes 642. This coupled disturbance increases the voltage of the gate and bulk connections of MOS transistors M1 and M2, thereby enhancing the operation of secondary ESD protection circuit 631. While three diodes 642 are shown coupled in series, it should be understood that greater or fewer than three diodes may be used depending on the particular embodiment and its specifications.

Figure 6F:
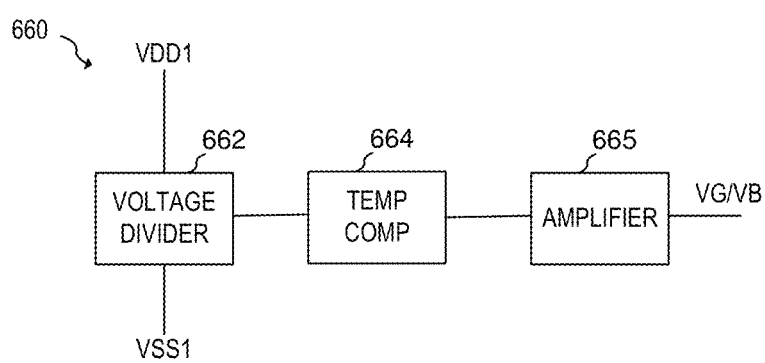

FIG. 6F illustrates trigger circuit 660 that may be used to implement trigger circuit 625 in accordance with an embodiment of the present invention. As shown trigger circuit includes a voltage divider 662, a temperature compensation circuit 664, and an amplifier 665 coupled between power supply node VDD1 and VSS1 in the first supply domain. In some embodiments, voltage divider may be implemented using one more diodes or diode connected transistors coupled in series with one or more resistors. Temperature compensation circuit 664 is configured to compensate for temperature dependencies of voltage divider 662. In some embodiments, temperature compensation circuit 664 includes one or more MOS transistors coupled to an output of the voltage divider 662. Amplifier 665 may include, for example, one or more cascaded inverters. In some embodiments, trigger circuit 660 may be implemented using trigger circuits disclosed in co-pending U.S. patent application Ser. No. 16/777,195, filed on Jan. 30, 2020, which has been incorporated herein by reference in its entirety.

Figure 7A:
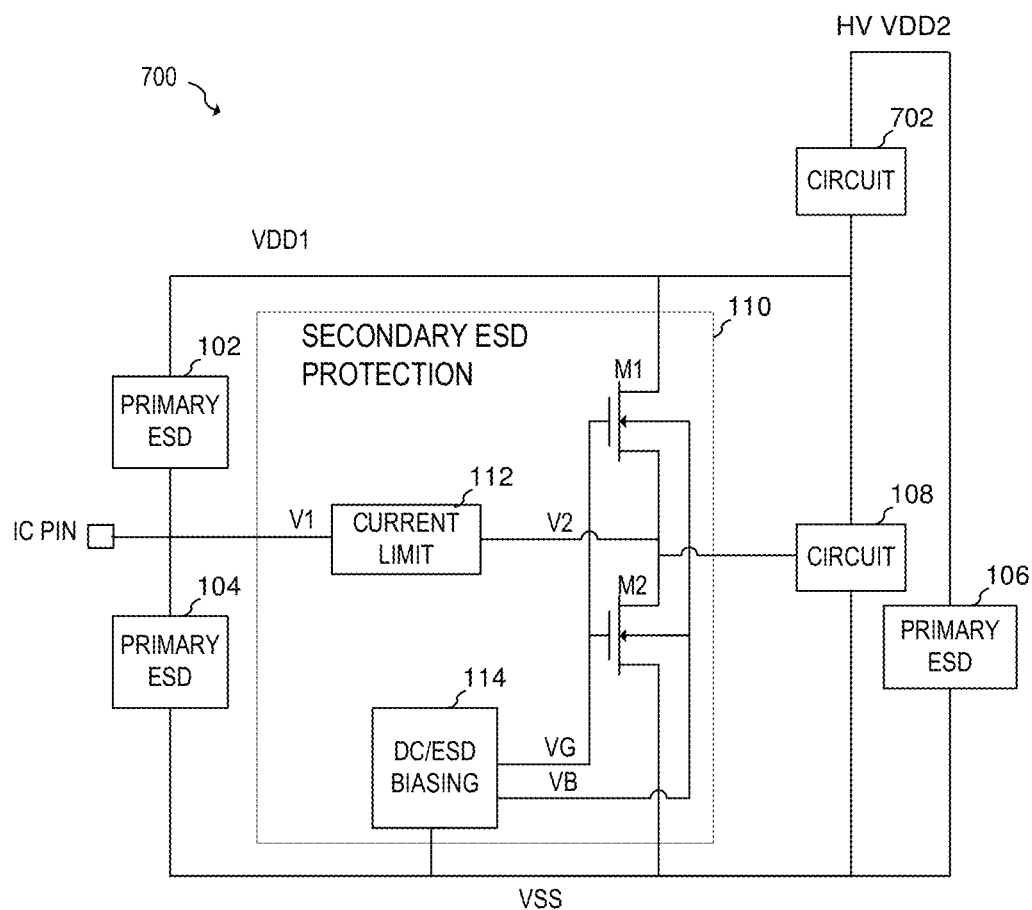
FIGS. 7A and 7B illustrate schematics of embodiment ESD protection systems in which the secondary ESD protection circuit is further interfaced to circuitry associated with a higher voltage power supply domain.

Embodiments of the present invention may also be adapted to work with multiple power supply domains having different voltage levels. FIG. 7A illustrates an ESD protection system 700 in which secondary ESD protection circuit is coupled to a first power domain associated with power supply nodes VDD1 and VSS, and a second, higher voltage power domain associated with power supply nodes VDD2 and VSS. In various embodiments, secondary ESD protection circuit 110 and primary ESD protection circuits 102, 104 and 106 are implemented and operate as explained in embodiments above, and are configured to provide ESD protection to circuit 108. However, in addition to circuit 108, an additional circuit 702 is connected between power supply node VDD1 of the first power supply domain and power supply node VDD2 of the second, higher voltage power domain. In some embodiments, an additional primary ESD circuit may also be coupled between VDD1 and VSS.

Circuit 702 may include circuitry such as a voltage adaptation circuit that provides an interface between the first and second power supply domains and/or may be associated with supplying power to one or more power supply domains. For example, in one embodiment circuit 702 may include level shifter circuitry or current mirror circuitry that is used to interface analog or digital signals between power supply domains. Circuit 702 may contain level shifter circuitry including digital inputs or outputs coupled to a lower voltage power supply domain such as the power supply domain associated with power supply nodes VDD1 and VSS, and have digital inputs or outputs coupled to circuitry within a higher power supply domain such as the power supply domain associated with power supply nodes VDD2 and VSS. This level shifter circuitry may be implemented using levels shifter circuitry known in the art. Similarly, analog signals may be transferred between power supply domains. In one example, circuits 702 is a current mirror may be used to accept a current input from a low-voltage power supply domain and mirror this current to a higher power supply domain, and vice versa. Such current mirror circuitry may be implemented using current mirror circuitry known in the art.

As mentioned above, circuit 702 may also include power supply circuitry. Such power supply circuitry may include, but are not limited to, linear voltage regulators, charge pump based power supply circuitry, switched mode power supply circuitry and/or circuits that are used to support switched mode power supply circuitry. Such circuits may be implemented using power supply circuits and systems known in the art.

Figure 7B:
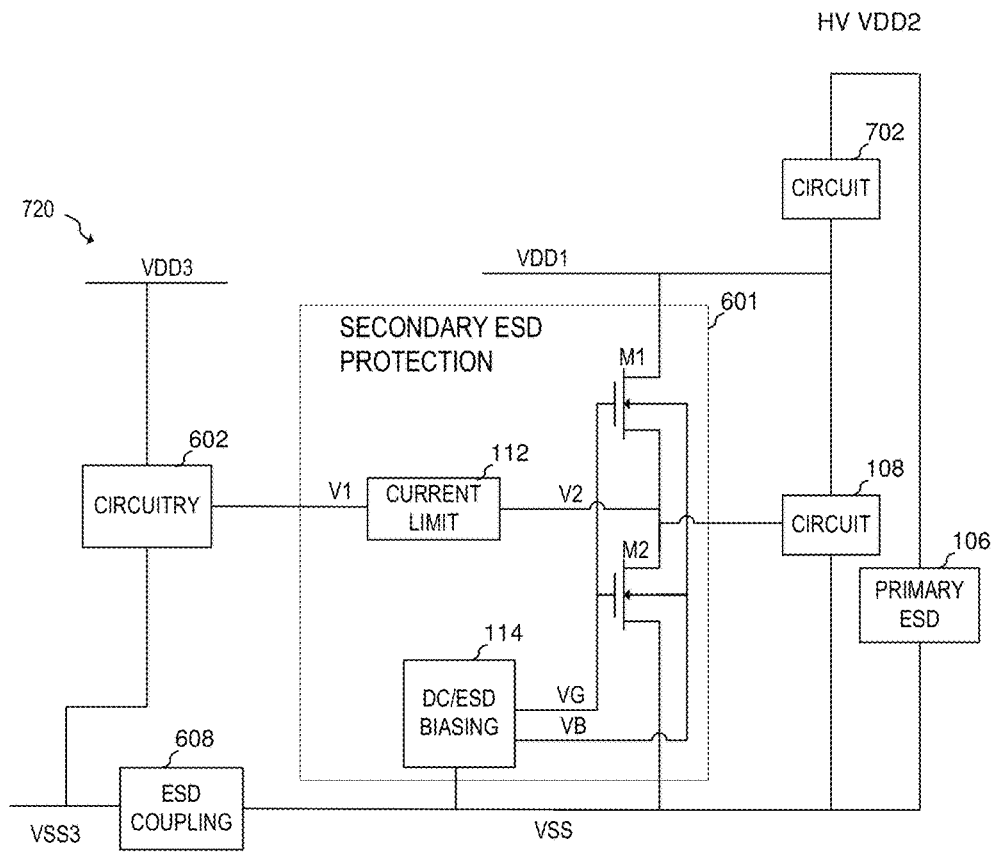

ESD protection system 700 shown in FIG. 7A may also be adapted to be interfaced with internal circuitry from an additional power supply domain. ESD protection system 720 shown in FIG. 7B is similar to ESD protection system 700 shown in FIG. 7A, with the exception that secondary ESD protection circuit 601 is interfaced to internal circuitry 602 which receives power from a third power supply domain associated with power supply nodes VDD3 and VSS3. In some embodiments, node VDD1 is an internal power supply node that is not connected to an external power supply pin. In such embodiments, node VDD1 is coupled to the output of an internal power supply circuit, such as a linear voltage regulator that is coupled to a higher voltage power supply node, such as HV VDD2. The manner in which ESD protection circuit 601 may operate and may be implemented in conjunction with circuitry 602 and its associated separate power supply domain is described above with respect to FIGS. 6A to 6F.

It should be understood that the embodiments of FIGS. 6A-6F are just few specific examples of implementing embodiment secondary ESD protection circuits in multiple power domains using. In alternative embodiment of the present invention, combinations of power domains could be used, as well as different trigger circuits known in the art.

Figure 8:
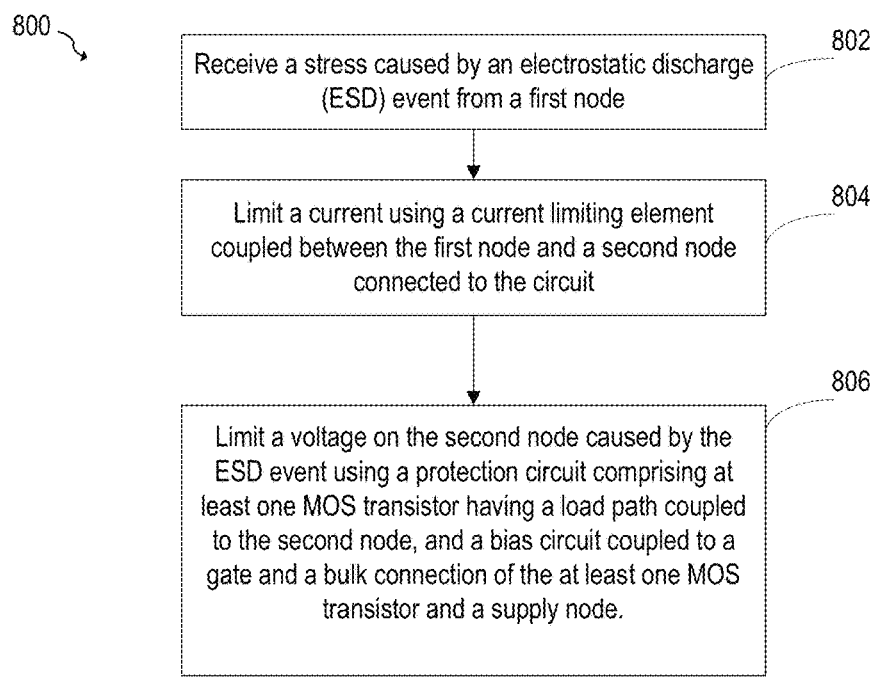
FIG. 8 illustrates a flowchart of an embodiment method of protecting a circuit.

FIG. 8 illustrates a flowchart of a method 800 of protecting a circuit. In step 802, a stress caused by an ESD event is received at a first node. In step 804, a current limiting element coupled between the first node and a second node is used to limit a current caused by the stress. In some embodiments, this current limiting element may be implemented using current limiting element 112 described above with respect to embodiments. In step 806, a voltage at the second node caused by the ESD event is limited using a protection circuit that includes at least one MOS transistor having a load path coupled to the second node, where the at least one MOS transistor is disposed in a well. The protection circuit also includes a bias circuit coupled to a gate and a bulk connection of the at least one MOS transistor and a supply node. In various embodiments, the at least one MOS transistor may be implemented using MOS transistor M1 and/or M2, and the bias circuit may be implemented using bias circuit 114 as described in embodiments herein. The supply node may be configured to be coupled to ground or coupled to another power supply voltage. It should be understood that, in some embodiments, steps 802, 804 and 806 of method 800 do not necessarily occur in sequential order and may, in fact, occur simultaneously.

Embodiments of the present invention are summarized here. Other embodiments can also be understood from the entirety of the specification and the claims filed herein.

Example 1. A method for protecting a circuit includes: receiving a stress caused by an electrostatic discharge (ESD) event from a first node; limiting a current using a current limiting element coupled between the first node and a second node connected to the circuit; and limiting a voltage on the second node caused by the ESD event using a protection circuit including at least one MOS transistor having a load path coupled to the second node, where the at least one MOS transistor is disposed in a well, and a bias circuit coupled to a gate and a bulk connection of the at least one MOS transistor and a supply node.

Example 2. The method of example 1, where limiting the voltage on the second node includes activating a parasitic bipolar transistor of the at least one MOS transistor.

Example 3. The method of one of examples 1 or 2, where the bias circuit includes a bias resistor having a first terminal connected to the supply node, and a second terminal coupled to the gate and the bulk connection of the at least one MOS transistor.

Example 4. The method of one of examples 1 to 3, where the bias circuit includes a bias transistor having a first load path terminal connected to the supply node, and a second load path terminal coupled to the gate and the bulk connection of the at least one MOS transistor.

Example 5. The method of example 4 further including: receiving, by a control node of the bias transistor, an ESD activation signal indicating an ESD event, and increasing an impedance of a load path of the bias transistor in response to the ESD activation signal.

Example 6. The method of example 6, where: the circuit is associated with a first voltage domain; and receiving the ESD activation signal includes receiving the ESD activation signal from a an ESD circuit coupled to power supply nodes of a second voltage domain different from the first voltage domain.

Example 7. The method of one of examples 1 to 6, where the at least one MOS transistor includes: a first MOS transistor having a first load path coupled between the second node and the supply node; and a second MOS transistor having a second load path coupled between the second node and a further supply node.

Example 8. The method of example 7, further including limiting a voltage on the first node caused by the ESD event, limiting the voltage on the first node including using a primary ESD protection circuit coupled between the first node and at least one of the supply node and the further supply node.

Example 9. An electrostatic discharge (ESD) circuit includes: a secondary ESD protection circuit coupled between an first node and a second node configured to be coupled to a first circuit to be protected, the secondary ESD protection circuit including a current limiting element coupled between the first node and the second node, a first MOS transistor having a first load path coupled between a first supply node and the second node, a second MOS transistor having a second load path coupled between the second node and a second supply node, where the first MOS transistor and the second MOS transistor are disposed in at least one well, and a bias circuit coupled to a first gate of the first MOS transistor, a first bulk connection of the first MOS transistor, a second gate of the second MOS transistor, and a second bulk connection of the second MOS transistor.

Example 10. The ESD circuit of example 9, further including a primary ESD protection circuit having a first terminal coupled to at least one of the first supply node and the second supply node, and a second terminal coupled to the first node.

Example 11. The ESD circuit of one of examples 9 or 10, where the bias circuit includes a bias resistor having a first terminal connected to one of the first supply node or the second supply node, and a second terminal coupled to the first gate of the first MOS transistor, the first bulk connection of the first MOS transistor, the second gate of the second MOS transistor, and the second bulk connection of the second MOS transistor.

Example 12. The ESD circuit of example ii, further including a bipolar junction transistor having a collector coupled to the first node, an emitter coupled to the second supply node, and a base coupled to the second terminal of the bias resistor.

Example 13. The ESD circuit of one of examples 9 to 12, where the bias circuit includes a bias transistor having a first load path terminal connected to one of the first supply node or the second supply node, and a second load path terminal coupled to the first gate of the first MOS transistor, the first bulk connection of the first MOS transistor, the second gate of the second MOS transistor, and the second bulk connection of the second MOS transistor.

Example 14. The ESD circuit of one of examples 9 to 13, where: the first supply node and the second supply node include supply nodes of a first voltage domain; and the first node is coupled to a second circuit to be protected, where the second circuit to be protected is configured to receive power from a second voltage domain different from the first voltage domain.

Example 15. The ESD circuit of example 14, where the first circuit to be protected is configured to receive power from a third voltage domain different from the first voltage domain and the second voltage domain.

Example 16. The ESD circuit of one of examples 9 to 15, where the first MOS transistor and the second MOS transistor include NMOS transistors.

Example 17. An integrated circuit including: a first circuit to be protected having a first input terminal coupled to an input node; a primary electrostatic discharge (ESD) protection circuit coupled to the input node and to at least one of a first supply node or a second supply node; and a secondary ESD circuit coupled between the input node and the first input terminal, the secondary ESD circuit including a current limiting element coupled between the input node and the first input terminal, at least one MOS transistor having a load path coupled to the first input terminal, a resistive bias circuit coupled to gate and bulk connections of the at least one MOS transistor.

Example 18. The integrated circuit of example 17, further including an input pad coupled to the input node.

Example 19. The integrated circuit of one of examples 17 or 18, further including a second circuit to be protected coupled to the input node, where the first circuit to be protected and the second circuit to be protected are powered by different power supply domains.

Example 20. The integrated circuit of example 19, further including a third circuit to be protected coupled between the first supply node and a third supply node, where the first circuit to be protected is coupled between the first supply node and the second supply node, where the third circuit to be protected is a voltage adaptation circuit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for protecting a circuit, the method comprising:
   receiving a stress caused by an electrostatic discharge (ESD) event from a first node connected to a primary ESD protection circuit;
   limiting a current using a current limiting element coupled between the first node and a second node connected to the circuit; and
   limiting a voltage on the second node caused by the ESD event using a protection circuit comprising
      at least one MOS transistor having a load path coupled to the second node, wherein the at least one MOS transistor is disposed in a well, and
      a bias circuit coupled to a gate and a bulk connection of the at least one MOS transistor and a supply node, wherein the bias circuit is coupled to the primary ESD protection circuit only via the supply node or via the at least one MOS transistor.

2. The method of claim 1, wherein limiting the voltage on the second node comprises activating a parasitic bipolar transistor of the at least one MOS transistor.

3. The method of claim 1, wherein the bias circuit comprises a bias resistor having a first terminal connected to the supply node, and a second terminal coupled to the gate and the bulk connection of the at least one MOS transistor.

4. The method of claim 1, wherein the bias circuit comprises a bias transistor having a first load path terminal connected to the supply node, and a second load path terminal coupled to the gate and the bulk connection of the at least one MOS transistor.

5. The method of claim 4, further comprising:
   receiving, by a control node of the bias transistor, an ESD activation signal indicating an ESD event, and
   increasing an impedance of a load path of the bias transistor in response to the ESD activation signal.

6. The method of claim 5, wherein:
   the circuit is associated with a first voltage domain; and
   receiving the ESD activation signal comprises receiving the ESD activation signal from a an ESD circuit coupled to power supply nodes of a second voltage domain different from the first voltage domain.

7. The method of claim 1, wherein the at least one MOS transistor comprises:
   a first MOS transistor having a first load path coupled between the second node and the supply node; and
   a second MOS transistor having a second load path coupled between the second node and a further supply node.

8. The method of claim 7, further comprising limiting a voltage on the first node caused by the ESD event, limiting the voltage on the first node comprising using the primary ESD protection circuit coupled between the first node and at least one of the supply node and the further supply node.

9. An electrostatic discharge (ESD) circuit comprising:
   a primary ESD protection circuit coupled to a first node; and
   a secondary ESD protection circuit coupled between the first node and a second node configured to be coupled to a first circuit to be protected, the secondary ESD protection circuit comprising
      a current limiting element coupled between the first node and the second node,
      a first MOS transistor having a first load path coupled between a first supply node and the second node,
      a second MOS transistor having a second load path coupled between the second node and a second supply node, wherein the first MOS transistor and the second MOS transistor are disposed in at least one well, and
      a bias circuit coupled to a first gate of the first MOS transistor, a first bulk connection of the first MOS transistor, a second gate of the second MOS transistor, and a second bulk connection of the second MOS transistor, wherein the bias circuit is coupled to the primary ESD circuit only via the first supply node, the second supply node, the first MOS transistor, or via the second MOS transistor.

10. The ESD circuit of claim 9, wherein the primary ESD protection circuit has a first terminal coupled to at least one of the first supply node or the second supply node, and a second terminal coupled to the first node.

11. The ESD circuit of claim 9, wherein the bias circuit comprises a bias resistor having a first terminal connected to one of the first supply node or the second supply node, and a second terminal coupled to the first gate of the first MOS transistor, the first bulk connection of the first MOS transistor, the second gate of the second MOS transistor, and the second bulk connection of the second MOS transistor.

12. The ESD circuit of claim 9, wherein the bias circuit comprises a bias transistor having a first load path terminal connected to one of the first supply node or the second supply node, and a second load path terminal coupled to the first gate of the first MOS transistor, the first bulk connection of the first MOS transistor, the second gate of the second MOS transistor, and the second bulk connection of the second MOS transistor.

13. The ESD circuit of claim 9, wherein:
   the first supply node and the second supply node comprise supply nodes of a first voltage domain; and
   the first node is coupled to a second circuit to be protected, wherein the second circuit to be protected is configured to receive power from a second voltage domain different from the first voltage domain.

14. The ESD circuit of claim 13, wherein the first circuit to be protected is configured to receive power from a third voltage domain different from the first voltage domain and the second voltage domain.

15. The ESD circuit of claim 9, wherein the first MOS transistor and the second MOS transistor comprise NMOS transistors.

16. An integrated circuit comprising:
   a first power domain comprising a first circuit coupled to a first power supply node and a first reference node;
   a second power domain comprising
      a second circuit coupled to a second power supply node and a second reference node,
      a secondary electrostatic discharge (ESD) circuit coupled between the first circuit at a first node and the second circuit at a second node, the secondary ESD circuit comprising
         at least one MOS transistor having a load path coupled to the second node, wherein the at least one MOS transistor is disposed in a well, and a current limiting element coupled between the first node and the second node;

a first ESD coupling circuit coupled between the first reference node and the second reference node; and a bias circuit coupled to a gate and bulk connection of the at least one MOS transistor.

17. The integrated circuit of claim 16, further comprising:

a third power domain comprising a third circuit coupled to a third power supply node and a third reference node, a further secondary electrostatic discharge (ESD) circuit coupled between the first circuit at a third node and the third circuit at a fourth node, the further secondary ESD circuit comprising at least one further MOS transistor having a load path coupled to the second node, wherein the at least one further MOS transistor is disposed in a further well, a further bias circuit coupled to a gate and a bulk connection of the at least one further MOS transistor and the third reference node, and a further current limiting element coupled between the third node and the fourth node; and a second ESD coupling circuit coupled between the first reference node and the third reference node, wherein the bias circuit of the second power domain is further coupled to the second reference node, wherein the bias circuit is further coupled to the second reference node.

18. The integrated circuit of claim 16, wherein the bias circuit is coupled to the first power supply node and the second power supply node.

19. The integrated circuit of claim 18, wherein the bias circuit comprises:

a capacitor coupled between the first power supply node and the gate and the bulk connection of the at least one MOS transistor; and a resistor coupled between the first reference node and the gate and the bulk connection of the at least one MOS transistor.

* * * * *